(12) United States Patent
Marui et al.

(10) Patent No.: US 11,154,983 B2
(45) Date of Patent: Oct. 26, 2021

(54) LINK ACTUATION DEVICE MANIPULATING DEVICE AND LINK ACTUATION SYSTEM

(71) Applicant: NTN CORPORATION, Osaka (JP)

(72) Inventors: Naoki Marui, Iwata (JP); Hiroshi Isobe, Iwata (JP); Seigo Sakata, Iwata (JP)

(73) Assignee: NTN CORPORATION, Osaka (JP)

( * ) Notice: Subject to any disclaimer, the term of this patent is extended or adjusted under 35 U.S.C. 154(b) by 128 days.

(21) Appl. No.: 16/208,061

(22) Filed: Dec. 3, 2018

(65) Prior Publication Data

US 2019/0099878 A1 Apr. 4, 2019

Related U.S. Application Data

(63) Continuation of application No. PCT/JP2017/020408, filed on Jun. 1, 2017.

(30) Foreign Application Priority Data

Jun. 5, 2016 (JP) .............................. JP2016-112317

(51) Int. Cl.
  *B25J 9/04* (2006.01)
  *B25J 9/00* (2006.01)
  (Continued)

(52) U.S. Cl.
  CPC ............... *B25J 9/0048* (2013.01); *B25J 9/10* (2013.01); *B25J 9/1623* (2013.01); *B25J 17/0266* (2013.01); *F16H 21/46* (2013.01)

(58) Field of Classification Search
  CPC . B25J 13/089; B25J 9/0048; B25J 9/10; B25J 9/1623; B25J 17/0266; F16H 21/46
  See application file for complete search history.

(56) References Cited

U.S. PATENT DOCUMENTS 5,893,296 A 4/1999 Rosheim
7,472,622 B2 1/2009 Isobe et al.
(Continued)

FOREIGN PATENT DOCUMENTS

CN 2005-147333 A 6/2005
CN 104203502 A 12/2014
(Continued)

OTHER PUBLICATIONS

Translation of WO-2014156784-A1. (Year: 2014).*
(Continued)

*Primary Examiner* — Randell J Krug

(57) ABSTRACT

In a link actuation device, a distal end side link hub is coupled to a proximal end side link hub via three or more link mechanisms such that a posture of the distal end side link hub can be changed relative to the proximal end side link hub, and a posture of the distal end side link hub relative to the proximal end side link hub is arbitrarily changed by actuators provided to two or more link mechanisms. The manipulating device includes a posture acquirer for acquiring a distal end posture represented by a bending angle and a turning angle, from a coordinate position at which a distal end side spherical link center is projected onto a two-dimensional rectangular coordinate system that has an origin located on an extension of an axis of the proximal end side link hub and is orthogonal to the extension of the axis.

14 Claims, 16 Drawing Sheets

(51) Int. Cl.
*B25J 9/10* (2006.01)
*F16H 21/46* (2006.01)
*B25J 9/16* (2006.01)
*B25J 17/02* (2006.01)

(56) References Cited

U.S. PATENT DOCUMENTS

| | | |
|---|---|---|
| 7,478,576 B2 | 1/2009 | Rosheim |
| 9,522,469 B2 | 12/2016 | Isobe et al. |
| 9,808,932 B2 | 11/2017 | Nishio et al. |
| 10,065,310 B2 | 9/2018 | Sakata et al. |
| 2005/0159075 A1* | 7/2005 | Isobe .................. B25J 9/0048 446/104 |
| 2006/0213308 A1 | 9/2006 | Rosheim |
| 2010/0043577 A1 | 2/2010 | Rosheim |
| 2015/0025684 A1* | 1/2015 | Negishi ............... B25J 9/1664 700/261 |
| 2015/0088308 A1* | 3/2015 | Isobe .................. B25J 9/0048 700/245 |
| 2016/0008977 A1 | 1/2016 | Nishio et al. |
| 2016/0361816 A1 | 12/2016 | Sakata et al. |

FOREIGN PATENT DOCUMENTS

| | | |
|---|---|---|
| CN | 104679934 A | 6/2015 |
| CN | 105189051 A | 12/2015 |
| JP | 2013-202725 | 10/2013 |
| JP | 2014-188602 | 10/2014 |
| JP | 2015-155124 | 8/2015 |
| WO | WO 2006/102393 A2 | 9/2006 |
| WO | WO 2009/148603 A1 | 12/2009 |
| WO | WO-2014156784 A1 * | 10/2014 ............ B25J 9/1623 |

OTHER PUBLICATIONS

Decision of Grant dated Dec. 19, 2017 in corresponding Japanese Patent Application No. 2016-112317†.
International Search Report dated Aug. 8, 2017 in corresponding International Application No. PCT/JP2017/020408.
English Translation by WIPO of the International Preliminary Report on Patentability dated Dec. 20, 2018 in corresponding International Application No. PCT/JP2017/020408, 8 pages.
Extended European Search Report dated Feb. 26, 2020 in European Patent Application No. 17810191.1 (4 pages).
Chinese Office Action dated Jun. 17, 2021, in Chinese Patent Application No. 201780034655.2 (10 pages including translation).

* cited by examiner $$Xa' = D \sin\left(\frac{\theta a}{2}\right) \cos \phi a \qquad \sin\left(\frac{\theta a}{2}\right) = \frac{\sqrt{Xa'^2 + Ya'^2}}{D}$$

$$Ya' = D \sin\left(\frac{\theta a}{2}\right) \sin \phi a \qquad \tan \phi a = \frac{Ya'}{Xa'}$$

EACH ARM ANGLE POSITION WHEN MOVEMENT IS MADE SUCH THAT TURNING ANGLE φ IS FIXED AT 15° AND BENDING ANGLE θ IS CHANGED FROM -60° TO 60°

LINK ACTUATION DEVICE MANIPULATING DEVICE AND LINK ACTUATION SYSTEM

CROSS REFERENCE TO THE RELATED APPLICATION

This application is a continuation application, under 35 U.S.C. § 111(a) of international patent application No. PCT/JP2017/020408, filed Jun. 1, 2017, which claims priority to Japanese patent application No. 2016-112317, filed Jun. 5, 2016, the entire disclosure of which is herein incorporated by reference as a part of this application.

BACKGROUND OF THE INVENTION

Field of the Invention

The present invention relates to a manipulating device for a link actuation device, such as medical equipment and industrial equipment, which requires a precise and wide operating range, and a link actuation system including the link actuation device and the manipulating device.

Description of Related Art

A link actuation device, that has a compact configuration but can operate in a precise and wide operating range, has been suggested in Patent Document 1. In Patent Document 1, a distal end side link hub is coupled to a proximal end side link hub via three or more trinodal chain link mechanisms such that the posture of the distal end side link hub can be changed relative to the proximal end side link hub.

Generally, in the link actuation device provided with three or more trinodal chain link mechanisms as described above: the distal end posture is determined by a bending angle and a turning angle; a rotation angle of the link is calculated from the bending angle and the turning angle; and an operating position of an actuator that rotationally drives the link is determined. Thus, conventionally, in changing the distal end posture, designation of a target distal end posture has been performed by inputting a bending angle and a turning angle. It is noted that the bending angle is a vertical angle formed when the center line or axis of the distal end side link hub is inclined relative to the axis of the proximal end side link hub, and the turning angle is a horizontal angle formed when the axis of the distal end side link hub is inclined relative to the axis of the proximal end side link hub.

Meanwhile, when an end effector is installed on the distal end side link hub and the link actuation device is actually used, the coordinate position of a workpiece to be worked on by the end effector is often handled in a rectangular coordinate system. Thus, in designation of a distal end posture by a bending angle and a turning angle, it is difficult to intuitively manipulate the link actuation device. For example, when the distal end side link hub is positioned in a certain distal end posture, and the distal end posture is changed from such a certain distal end posture so that the end effector moves by a movement amount designated in the rectangular coordinate system, an operator has to transform movement in the rectangular coordinate system to movement in an angular coordinate system represented by a bending angle and a turning angle so as to determine an operation amount of the actuator. Thus, it is difficult to manipulate the link actuation device, and experience and special training are required.

As a manipulating device that solves the above-mentioned problem, Patent Document 2 has been suggested. In Patent Document 2, arbitrary rectangular coordinates in a range on an extension of the posture of a link actuation device are designated, and a posture of a link hub is obtained from the rectangular coordinates so as to position the link hub, whereby the link actuation device can be intuitively manipulated.

Related Document

Patent Document

[Patent Document 1] U.S. Pat. No. 5,893,296
[Patent Document 2] JP Laid-open Patent Publication No. 2013-202725

The manipulating device disclosed in Patent Document 2 is excellent in allowing for intuitive manipulation. However, in transformation from rectangular coordinates (X, Y, Z) to a posture ($\theta$, $\varphi$) of the link hub that is needed for control by a control device, convergence operation is used. Thus, calculation takes time.

SUMMARY OF THE INVENTION

An object of the present invention is to provide a manipulating device for a link actuation device and a link actuation system including the link actuation device and the manipulating device, in which link actuation device wherein control of each actuator that changes a distal end posture is handled in an angular coordinate system, teaching of a target distal end posture is easily performed and input transformation to an angular coordinate system can be simply and quickly performed without performing convergence operation.

The summary of the present invention will now be described using the reference signs in the figures showing embodiments.

A manipulating device 62 of the present invention manipulates a link actuation device 50, which link actuation device 50 includes: a proximal end side link hub 2; a distal end side link hub 3; three or more link mechanisms 4 interposed between the proximal end side link hub 2 and the distal end side link hub 3, the link mechanisms 4 coupling the distal end side link hub 3 to the proximal end side link hub 2 such that a posture of the distal end side link hub 3 can be changed relative to the proximal end side link hub 2; and an actuator 51 provided to each of two or more link mechanisms 4 among the three or more link mechanisms 4 and configured to arbitrarily change the posture of the distal end side link hub 3 relative to the proximal end side link hub 2.

Each of the link mechanisms 4 includes: a proximal side end link member 5 having one end rotatably coupled to the proximal end side link hub 2; a distal side end link member 6 having one end rotatably coupled to the distal end side link hub 3; and an intermediate link member 7 having opposite ends rotatably coupled to other ends of the proximal side and distal side end link members 5 and 6, respectively.

The distal end posture is defined by: a bending angle $\theta$, that is a vertical angle formed when a center line or axis QB of the distal end side link hub 3 is inclined relative to a center line or axis QA of the proximal end side link hub 2; and a turning angle $\varphi$, that is a horizontal angle formed when the axis QB of the distal end side link hub 3 is inclined relative to the axis QA of the proximal end side link hub 2. The manipulating device 62 includes a posture acquirer 64 configured to acquire the distal end posture ($\theta$, $\varphi$) represented by the bending angle θ and the turning angle φ, from a coordinate position (X', Y') at which a spherical link center PB of the distal end side link hub 3 is projected onto a two-dimensional rectangular coordinate system that is orthogonal to an extension of the axis QA of the proximal end side link hub 2 and has an origin O' at a point of intersection of the extension between the axis QA of the proximal end side link hub 2 and the two-dimensional rectangular coordinate system (for, example, onto a work plane W).

The "spherical link center PB" refers to a point at which, on a proximal side and a distal side, the central axes of each revolute pair between the link hubs 2 and 3 and arms (the end link members 5 and 6) and each revolute pair between the respective arms and the intermediate link member intersect each other. Each link mechanism 4 has, for example, a shape in which a proximal end side portion and a distal end side portion are symmetrical with each other with respect to a center portion of the intermediate link member 7 in a geometric model depicted with straight lines representing the link mechanism 4. In addition, an end effector 61 is installed on the distal end side link hub 3.

In the link actuation device 50 having the above configuration, the distance (D) between the respective spherical link centers PA and PB of the proximal end side link hub 2 and the distal end side link hub 3 is always constant. Thus, when the coordinates (X', Y') at which the distal end side spherical link center PB is projected onto the plane are used, the distal end posture, of the distal end side link hub 3, which is represented by the bending angle θ and the turning angle φ can be easily obtained without convergence operation. Therefore, with the manipulating device 62 for the link actuation device 50, teaching of a target distal end posture is easily performed, and input transformation to an angular coordinate system can be simply and quickly performed without needing convergence operation.

In the present invention, the posture acquirer 64 may include: a posture acquisition section 64a configured to designate coordinates (X', Y') of a point, at which the spherical link center PBa of the distal end side link hub 3 is projected onto the two-dimensional rectangular coordinate system, through manual operation; and a calculation section 64b configured to acquire a distal end posture (θ, φ) represented by a bending angle θ and a turning angle φ, from the coordinates (X', Y') designated by the posture acquisition section 64a. The posture acquisition section 64a can adopt various designation methods. For example, the coordinates (X', Y') of the point, at which the spherical link center PBa of the distal end side link hub 3 is projected, are inputted as numerical values by the input device 68. Other than the above, when the link actuation device 50 may be manually moved to a target position, the coordinates (X', Y') may be calculated and designated from a rotation angle detected by an angle detector fitted to each actuator 51 of the link actuation device 50. In addition, coordinate values on the three-dimensional rectangular coordinate system may be inputted, and then, transformed by the posture acquisition section 64a, to the coordinates (X', Y') of the point obtained by the above projection. When the bending angle θ and the turning angle φ are provided to the control device 61, the control device 61 performs transformation to a rotation angle of each arm on the basis of the following relationship, so as to control each actuator 51. That is, in the link actuation device 50, regarding a certain posture (a bending angle, a turning angle) A (θa, φa) and another posture B (θb, φb) of the link hubs 2 and 3, arm rotation angles corresponding to the postures A and B satisfy a relationship, as a rotation angle A ($\beta 1a$, $\beta 2a$, $\beta 3a$) and a rotation angle B ($\beta 1b$, $\beta 2b$, $\beta 3b$), by a relation formula between the link hubs 2, 3 and the arm rotation angles. Thus, each actuator 51 can be controlled by designation of the bending angle θ and the turning angle φ.

In the present invention, the manipulating device 62 may include a relay point setter 66 configured to set a relay point M that is passed when the distal end posture is changed, and the relay point setter 66 may calculate and set the relay point M, based on a determined rule, by using coordinates (X', Y') of a point at which the distal end side spherical link center PBa is projected onto the two-dimensional rectangular coordinate system. The determined rule is, for example, a rule that a later-described angle is equally divided, a rule that division is performed only in the case of movement by a predetermined movement amount, or the like.

Since the relay point M is set, desired work by the end effector 61 mounted on the distal end side link hub 3 can be accurately performed, and interference of the link actuation device 50 with an article or the like around the link actuation device 50 during movement for posture change can be avoided. Furthermore, in the case of changing the distal end posture by a wide angle, by setting the relay point M, positioning control can be performed without great deviation of the relative position of each arm rotation angle on a midway path L from the position that satisfies the relation formula. Therefore, without applying an excessive load to the parallel link mechanism 1, high-speed movement can be achieved. In the case of setting a relay point M on a midway path in movement from a certain posture A to another posture B, the relay point M can be easily obtained, without convergence operation, by using the coordinates (X', Y') at which the distal end side spherical link center is projected onto an arbitrary plane, instead of using arbitrary rectangular coordinates (X, Y, Z) in a range on an extension of the posture of the link actuation device 50.

In the present invention, the relay point setter 66 may calculate and set the relay point M by dividing an angle γ formed by: a distal end side spherical link center PBa before change of the distal end posture; a proximal end side spherical link center PAa (=PAb); and the distal end side spherical link center PBb after change of the distal end posture. In the case of dividing the midway path L and continuously passing through the divided midway path L in changing the posture from a certain posture A to another posture B, the midway path L is divided such that the angle γ, formed by the distal end side spherical link center PBa and the proximal end side spherical link center PAa (PAb) in the posture A and the distal end side spherical link center PBb in the posture B, is equally divided. By so doing, convergence operation, that is required for division using the rectangular coordinates of the distal end before and after posture change, is rendered to be unnecessary.

In the present invention, when the distal end posture moves by a predetermined movement amount or greater, the relay point setter 66 may set the relay point M by dividing the movement amount so as to make the movement amount equal to or less than the predetermined movement amount. In the case of changing the posture from a certain posture A to another posture B by a wide angle, if the relative position of each arm rotation angle in the middle of driving greatly deviates from the position that satisfies the relation formula, an excessive load is applied to the link. In view of that, by providing the relay point M, which satisfies the relation formula, in the middle of driving and performing positioning control without great deviation from the relay point M, high-speed movement can be achieved without applying an excessive load to the link. In obtaining the posture at the relay point M, the posture can be easily obtained by using the projection coordinates (X', Y') of the distal end side spherical link center PBa.

In the present invention, the relay point setter 66 may set the relay point M by dividing a midway path L for the distal end posture by a predetermined number. The "predetermined number" may be arbitrarily set. When the midway path L is divided by the predetermined number, setting of the relay point M can be easily performed.

In the present invention, in the case where the relay point setter 66 is provided, the relay point setter 66 may equally divide a midway path L through which the distal end side spherical link center PBa passes. Even when the distance is equally divided and the relay point M is set, setting of the relay point M can be easily performed, and smooth movement is achieved since the link actuation device moves so as to pass through the relay point M.

In the present invention, the relay point setter 66 may include an interpolator 69 configured to perform linear interpolation of a midway path L through which the distal end side spherical link center passes. According to the linear interpolation, the link actuation device 50 can be moved so as to be close to a desired path, by a simple interpolation process.

In the present invention, the relay point setter 66 may include an interpolator 69 configured to perform circular interpolation of a midway path L through which the distal end side spherical link center passes. According to the circular interpolation, when a path through which the distal end side spherical link center PBa passes is curved, the link actuation device 50 can be moved so as to be closer to a desired path, by a simple interpolation process.

A link actuation system of the present invention includes: the manipulating device 62 for the link actuation device 50 having any of the above configurations of the present invention; and the link actuation device 50. Thus, in the link actuation device 50 in which control of each actuator 51, which changes the distal end posture, is handled in an angular coordinate system, teaching of a target distal end posture is easily performed, and input transformation to an angular coordinate system can be simply and quickly performed without performing convergence operation.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
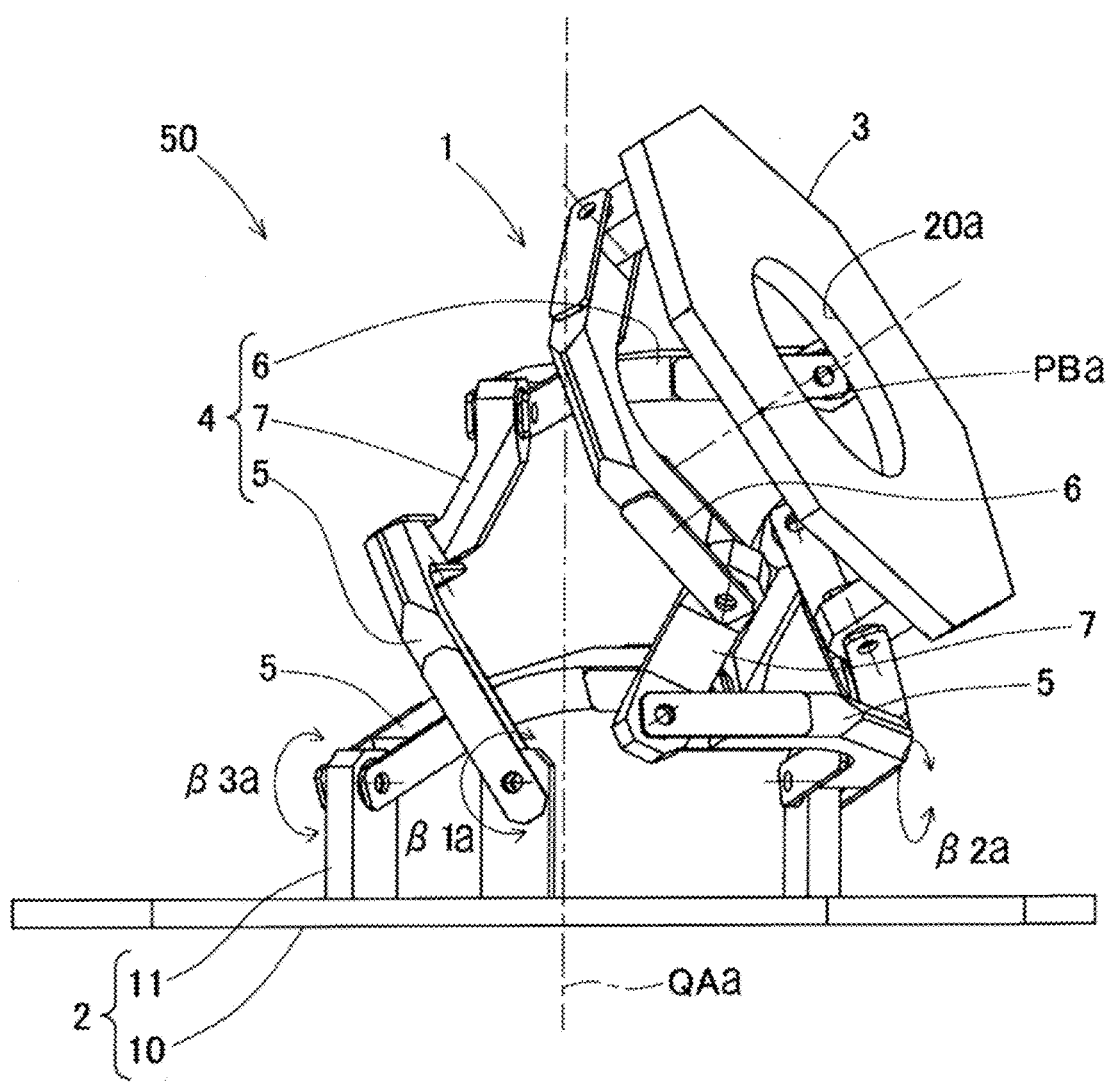
FIG. 1 is a perspective view of a link actuation device to be manipulated by a manipulating device according to an embodiment of the present invention.

A manipulating device according to an embodiment of the present invention and a link actuation device to be manipulated by the manipulating device will be described with reference to FIG. 1 to FIG. 16. FIG. 1 illustrates a parallel link mechanism 1, and a link actuation device 50 includes: the parallel link mechanism 1; actuators 51; and an end effector 61 shown in FIG. 16. The link actuation device 50 is controlled by a controller 60 having: a control device 61 shown in FIG. 2; and a manipulating device 62 that inputs a manipulation command into the control device 61.

The parallel link mechanism 1 will be described with reference to FIG. 1 and FIG. 12 to FIG. 15. The parallel link mechanism 1 is of a type in which a distal end side link hub 3 is coupled to a proximal end side link hub 2 via three link mechanisms 4 such that the posture of the distal end side link hub 3 can be changed relative to the proximal end side link hub 2. In FIG. 14, only one link mechanism 4 is shown. The number of link mechanisms 4 may be four or more.

Figure 12:
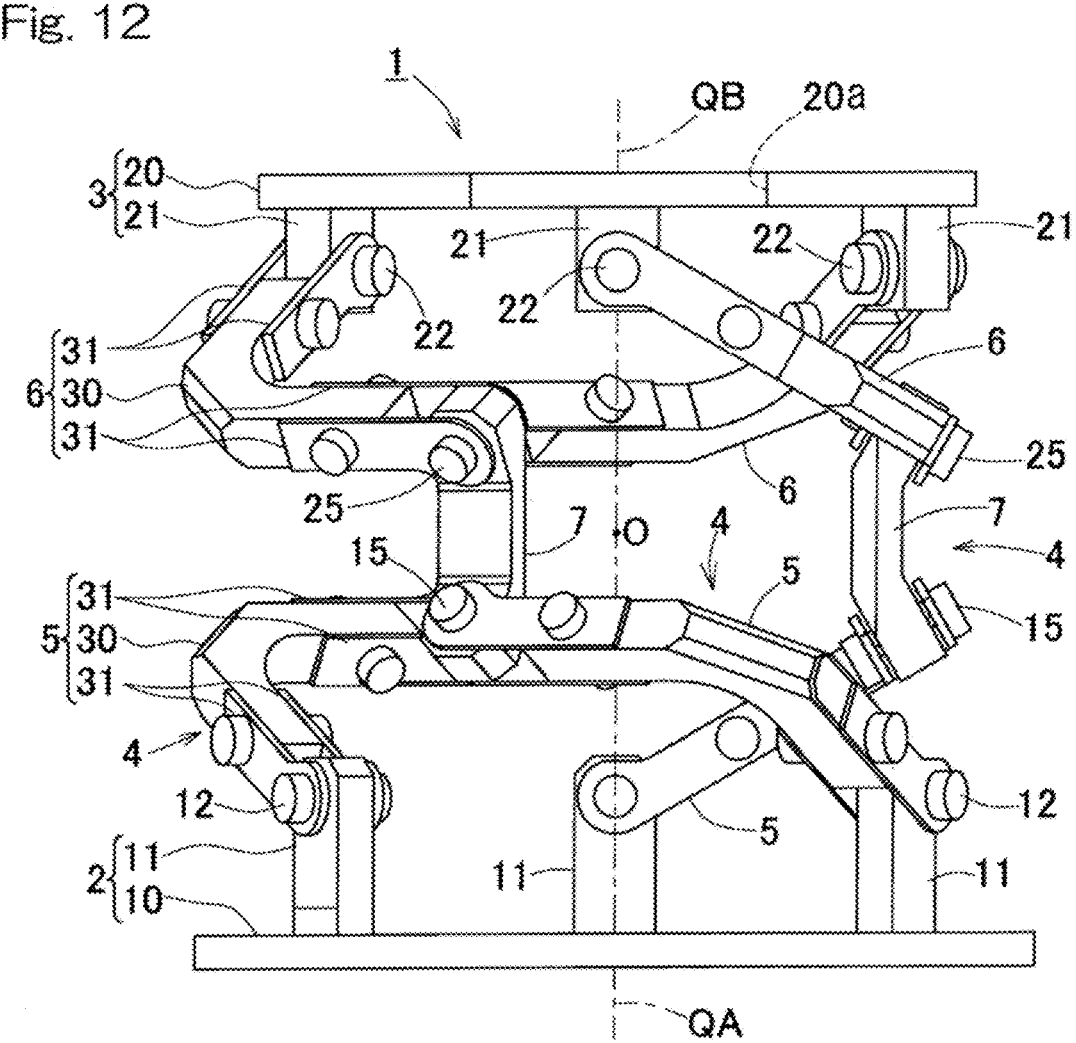
FIG. 12 is a front view of a parallel link mechanism in the link actuation device.

In FIG. 12, each link mechanism 4 includes a proximal side end link member 5, a distal side end link member 6, and an intermediate link member 7, and forms a quadric chain link mechanism composed of four revolute pairs. The proximal side and distal side end link members 5 and 6 each have an L-shape. The proximal side end link member 5 has one end rotatably coupled to the proximal end side link hub 2, and the distal side end link member 6 has one end rotatably coupled to the distal end side link hub 3. The intermediate link member 7 has opposite ends rotatably coupled to the other ends of the proximal side and distal side end link members 5 and 6, respectively.

The parallel link mechanism 1 is formed by combining two spherical link mechanisms. The center lines or axes of the revolute pairs between the proximal end side link hub 2 and the proximal side end link member 5 and the center lines or axes of the revolute pairs between the proximal side end link member 5 and the intermediate link member 7 intersect each other at a proximal end side spherical link center PA (FIG. 14). The center lines or axes of the revolute pairs between the distal end side link hub 3 and the distal side end link member 6 and the center lines or axes of the revolute pairs between the distal side end link member 6 and the intermediate link member 7 intersect each other at a distal end side spherical link center PB (FIG. 14). In addition, at the proximal end side and at the distal end side, the distances from the spherical link centers PA and PB to the revolute pairs between the link hubs 2 and 3 and the end link members 5 and 6 are equal to each other, and the distances from the spherical link centers PA and PB to the revolute pairs between the end link members 5 and 6 and the intermediate link members 7 are also equal to each other. The axes of the revolute pairs between the end link members 5 and 6 and the intermediate link member 7 may form a certain cross angle δ, or may be parallel to each other.

Figure 13:
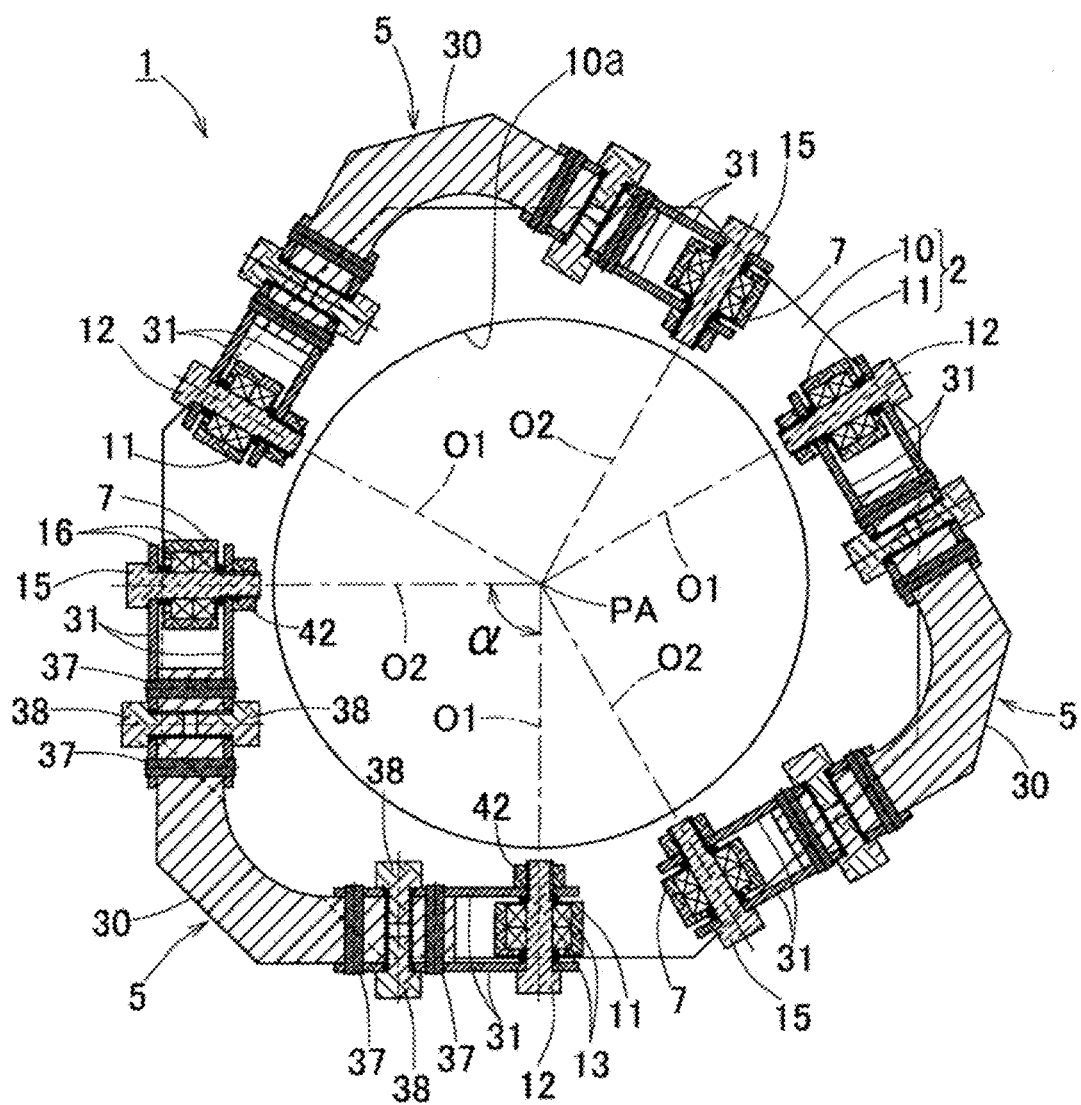
FIG. 13 is a cross-sectional view of the parallel link mechanism.
Figure 14:
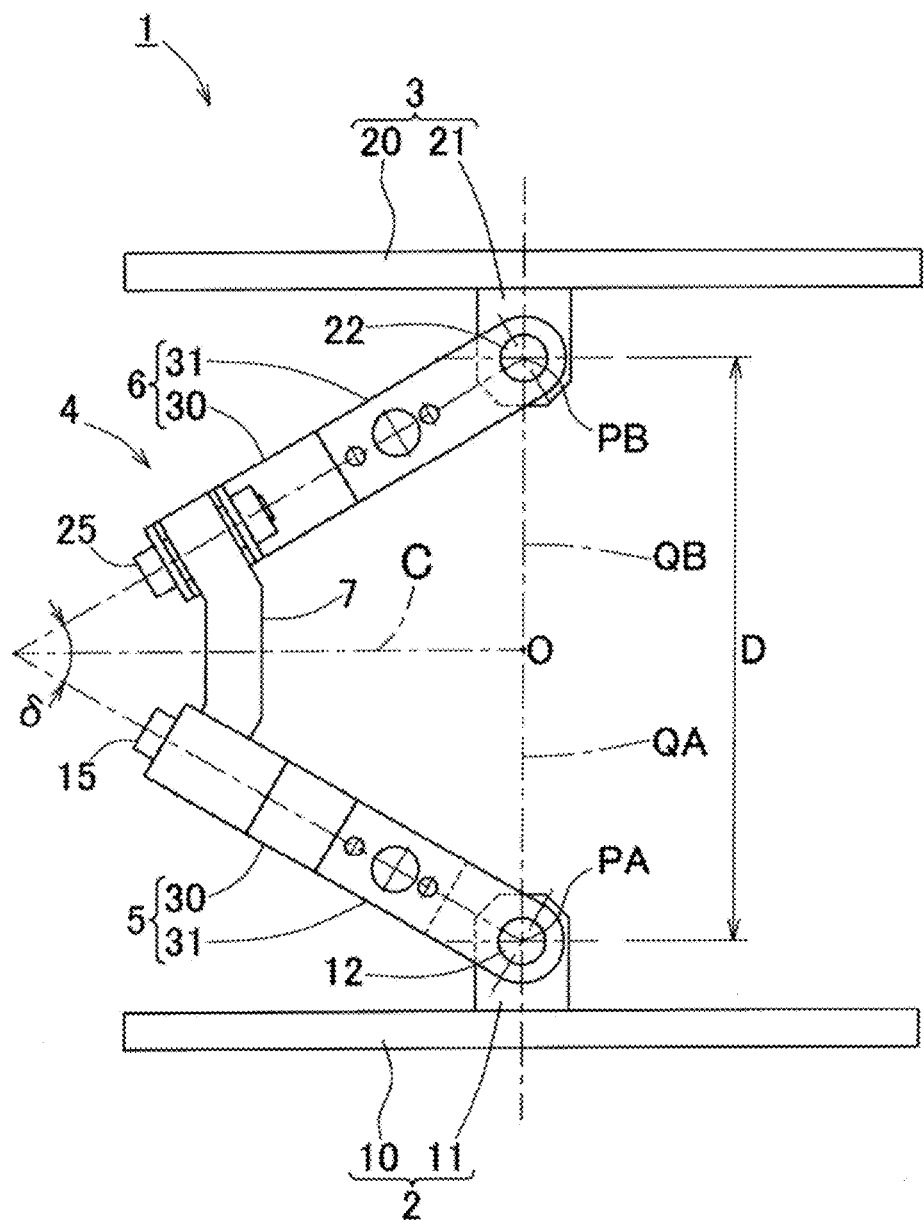
FIG. 14 is a front view showing one link mechanism of the parallel link mechanism.

FIG. 13 is a cross-sectional view of the proximal end side link hubs 2, the proximal side end link members 5 or the like. FIG. 13 shows the relationship between the proximal end side spherical link center PA and the axes O1 of the revolute pairs between the proximal end side link hub 2 and the proximal side end link members 5. The shapes and the positional relationship of the distal end side link hub 3 and the distal side end link member 6 are the same as in FIG. 13 (not shown). In FIG. 13, the angle α formed by the axis O1 of each of the revolute pairs between the proximal end side link hub 2 (distal end side link hub 3) and the proximal side end link member 5 (distal side end link member 6) and the axis O2 of each of the revolute pairs between the proximal side end link member 5 (distal side end link member 6) and the intermediate link member 7 is set at 90°, but may be an angle other than 90°.

Figure 15:
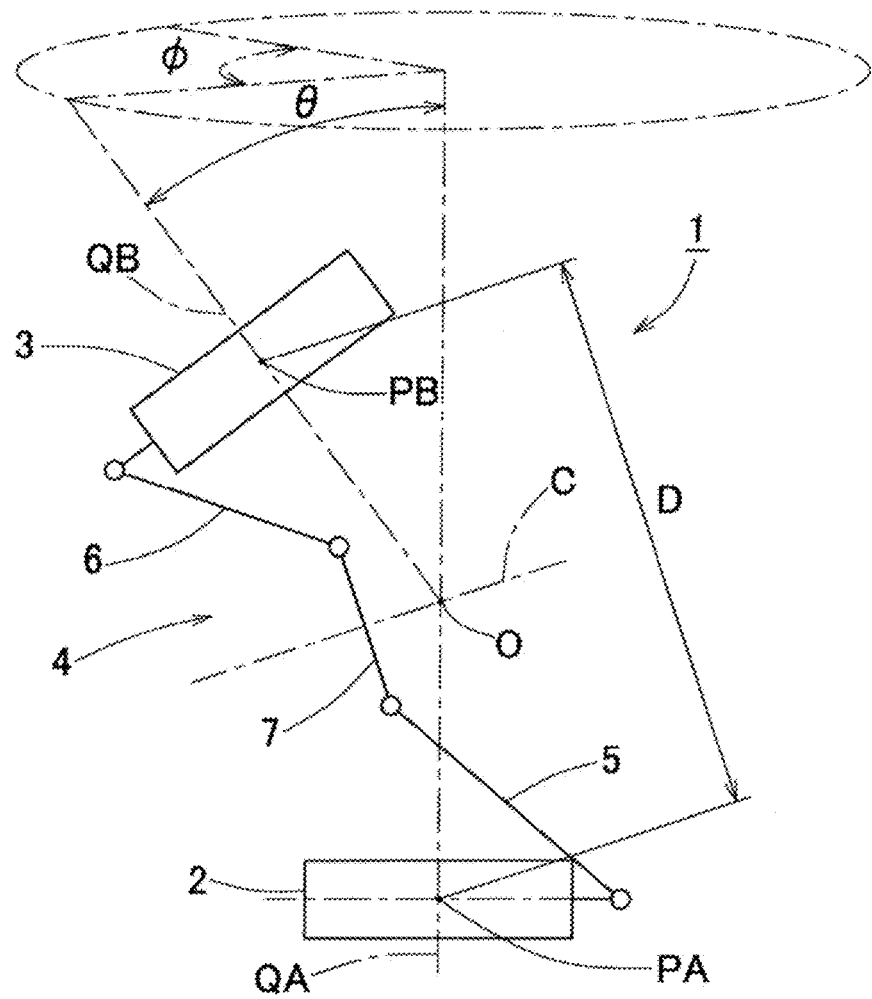
FIG. 15 is a model diagram showing each link of the parallel link mechanism by line segments.

The three link mechanisms 4 have a geometrically identical configuration. The geometrically identical configuration means that, as shown in FIG. 15, a geometric model depicted with straight lines representing the link members 5, 6, and 7, that is, a model depicted with the revolute pairs and straight lines connecting these revolute pairs, represents a shape in which the proximal end side portion thereof and the distal end side portion thereof are symmetrical with each other with respect to the center portion of the intermediate link member 7. FIG. 15 is a diagram showing one link mechanism 4 depicted with straight lines. The parallel link mechanism 1 in this example is of a rotation symmetrical type, and has a positional configuration in which the positional relationship between a proximal side region composed of the proximal end side link hub 2 and the proximal side end link member 5, and a distal side region composed of the distal end side link hub 3 and the distal side end link member 6 is in rotation symmetry relative to a center line C of the intermediate link member 7.

The proximal end side link hub 2, the distal end side link hub 3, and the three link mechanisms 4 cooperate together to form a two-degrees-of-freedom mechanism in which the distal end side link hub 3 is rotatable about two mutually orthogonal axes relative to the proximal end side link hub 2. In other words, the mechanism allows the distal end side link hub 3 to rotate with two degrees of freedom to change its posture, relative to the proximal end side link hub 2. This two-degrees-of-freedom mechanism is compact in size, but can achieve a wide range of movement for the distal end side link hub 3 relative to the proximal end side link hub 2.

For example, a straight line that passes through the proximal end side spherical link center PA and that intersects the axes O1 (FIG. 4) of the respective revolute pairs between the proximal end side link hub 2 and the proximal side end link member 5 at a right angle are defined as a center line or axis (hereinafter, referred to as "proximal end side link hub axis") QA of the proximal end side link hub 2. A straight line that passes through the distal end side spherical link center PB and that intersects the axes O1 (FIG. 4) of the revolute pairs between the distal end side link hub 3 and the distal side end link member 6 at a right angle are defined as a center line or axis (hereinafter, referred to as "distal end side link hub axis") QB of the distal end side link hub 3. In this case, the maximum value of a bend angle θ (FIG. 15) between the proximal end side link hub axis QA and the distal end side link hub axis QB can be about ±90°. In addition, an angle of traverse φ (FIG. 15) of the distal end side link hub 3 relative to the proximal end side link hub 2 can be set in the range of 0° to 360°. The bend angle θ means a vertical angle formed when the distal end side link hub axis QB is inclined relative to the proximal end side link hub axis QA. The angle of traverse φ means a horizontal angle formed when the distal end side link hub axis QB is inclined relative to the proximal end side link hub axis QA.

Change of the posture of the distal end side link hub 3 relative to the proximal end side link hub 2 is performed with, as a rotation center, the point of intersection O between the proximal end side link hub axis QA and the distal end side link hub axis QB. FIG. 12 shows a state where the proximal end side link hub axis QA and the distal end side link hub axis QB are on the same line, and FIG. 1 shows a state where the distal end side link hub axis QB forms a certain operating angle relative to the proximal end side link hub axis QA. Even when the posture is changed, the distance D (FIG. 2, FIG. 5) between the proximal and distal end side spherical link centers PA and PB does not change.

In the parallel link mechanism 1,
(i) if the angular positional relationships between the intermediate link member 7 and the end link members 5 and 6 with respect to the symmetry plane of the intermediate link member 7 are made identical between the proximal end side and the distal end side when:
(ii) the angles of the axes O1 of the revolute pairs between the link hubs 2 and 3 and the end link members 5 and 6 in each link mechanism 4 and the lengths from the spherical link centers PA and PB to the revolute pairs between the link hubs 2 and 3 and the end link members 5 and 6 are equal to each other;
(iii) the axes O1 of the revolute pairs between the link hubs 2 and 3 and the end link members 5 and 6 of each link mechanism 4 and the axes O2 of the revolute pairs between the end link members 5 and 6 and the intermediate link 7 intersect the spherical link centers PA and PB at the proximal end side and the distal end side;

(iv) the geometrical shapes of the proximal side end link member 5 and the distal side end link member 6 are the same; and (v) the shape of the intermediate link member 7 is the same between the proximal end side and the distal end side, the proximal side region composed of the proximal end side link hub 2 and each proximal side end link member 5, and the distal side region composed of the distal end side link hub 3 and each distal side end link member 6 move in the same manner due to the geometrical symmetry.

As shown in FIG. 1 and FIG. 13, the proximal end side link hub 2 includes: a flat plate-shaped base 10 having a circular through hole 10a defined in a center portion thereof; and three rotation shaft coupling members 11 provided around the through hole 10a of the base 10 at equal interval in the circumferential direction. The center of the through hole 10a is located on the proximal end side link hub axis QA. A rotation shaft 12 is rotatably coupled to each rotation shaft coupling member 11 which shaft has an axis that intersects the proximal end side link hub axis QA. The proximal side end link member 5 has one end coupled to the rotation shaft 12. Each of the end link members 5 and 6 includes a rod-shaped member 30 and a plate-shaped member 31.

The rotation shaft 12 has, at a radially outer end thereof, a head portion having a larger diameter than the other portion, and has an external thread portion 12b at a radially inner end thereof. In the example in these drawings, the rotation shaft 12 is coupled to the rotation shaft coupling member 11 via two bearings 13, but may be rotatably coupled to the rotation shaft coupling member 11 so as to be in contact with the rotation shaft coupling member 11.

A rotation shaft 15 is rotatably coupled to one end of the intermediate link member 7 and is coupled to the other end of the proximal side end link member 5. Similar to the rotation shaft 12 at the proximal end side link hub 2, the rotation shaft 15 at the intermediate link member 7 also has, at a radially outer end thereof, a head portion having a larger diameter than the other portion, and has an external thread portion at a radially inner end thereof. In addition, in the example in these drawings, the rotation shaft 15 is coupled to the intermediate link member 7 via two bearings, but may be rotatably coupled to the intermediate link member 7 so as to be in contact with the intermediate link member 7.

As shown in FIG. 1, the distal end side link hub 3 includes: a flat plate-shaped distal end member 20 having a circular through hole 20a defined in a center portion thereof; and three rotation shaft coupling members 21 (FIG. 12) provided around the through hole 20a of the distal end member 20 equidistantly in the circumferential direction. The center of the through hole 20a is located on the distal end side link hub axis QB. A rotation shaft 22 is rotatably coupled to each rotation shaft coupling member 21, which shaft 22 has an axis that intersects the distal end side link hub axis QB. The distal side end link member 6 has one end coupled to the rotation shaft 22 at the distal end side link hub 3. A rotation shaft 25 is rotatably coupled to the other end of the intermediate link member 7 and is coupled to the other end of the distal side end link member 6. The rotation shaft 22 at the distal end side link hub 3 and the rotation shaft 25 at the intermediate link member 7 also have the same shape as the rotation shafts 12 and 15, and are rotatably coupled to the rotation shaft coupling member 21 and the other end of the intermediate link member 7, respectively, via two bearings (not shown).

Figure 16:
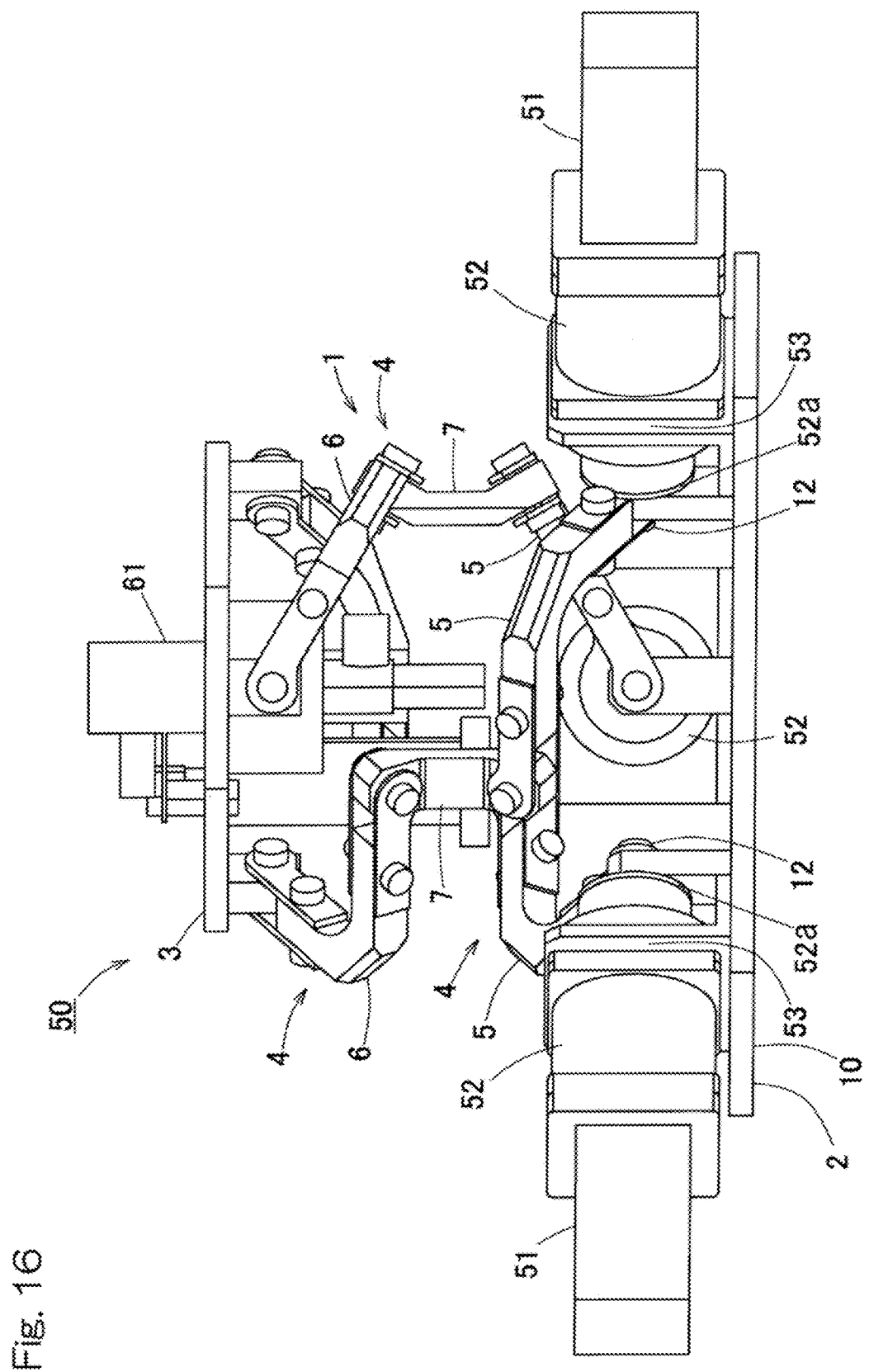
FIG. 16 is a front view showing an example of an installation of actuators and an end effector of the link actuation device.

The link actuation device 50 is used, while the end effector 61 is installed on the distal end side link hub 3, for example, as shown in FIG. 16. The angle of two degrees of freedom of the end effector 61 can be controlled by changing the posture of the distal end side link hub 3 relative to the proximal end side link hub 2 by the actuators 51 for posture change. A rotary actuator including a speed reduction mechanism 52 is used as each actuator 51 for posture change, and thus, the allowable load can be improved. In addition, the inertia moment ratio can be reduced, and thus, high-speed movement can be achieved.

In the link actuation device 50 having this configuration, each actuator 51 for posture change is a rotary actuator, and an output shaft 52a of the speed reduction mechanism 52 of each actuator 51 is of a flange output type. Accordingly, each actuator 51 for posture change can be installed directly on the parallel link mechanism 1. Thus, a drive mechanism portion has a simple structure, and an inexpensive link actuation device 50 can be realized. It is noted that the output shaft 51a of each actuator 51 may be composed of a flange output type without providing a speed reduction mechanism.

Control and an operation system will be described with reference to FIG. 2. Operation of each actuator 51 is controlled by the control device 61 on the basis of a manipulation command from the manipulating device 62.

The control device 61 is of a computer numerical control type. The control device 61 obtains a target rotation angle βn (β1a, β2a, β3a) (FIG. 1) for each proximal side end link member 5 in accordance with distal end posture angle information (θ, φ) provided by a posture information provider 67 of the manipulating device 62, and performs feedback control on each actuator 51 such that an actual rotation angle βn detected by a posture detector 68 (FIG. 1) becomes the target rotation angle βn. In the link actuation device 50, regarding a certain posture (a bending angle, a turning angle) A (θa, φa) and another posture B (θb, φb) of the distal end side link hub 3, arm rotation angles corresponding to the postures A and B satisfy a relationship, as a rotation angle A (β1a, β2a, β3a) and a rotation angle B (β1b, β2b, β3b), by a relation formula (1), as discussed below, of the link hubs and the arm rotation angles.

The manipulating device 62 has a posture acquirer 64, a relay point setter 66, and the posture information provider 67, and also has an input device 68. The posture acquirer 64 acquires a distal end posture (θ, φ) represented by the bending angle θ and the turning angle φ, from the coordinates (X', Y') of a point at which the spherical link center PB of the distal end side link hub 3 is projected onto a two-dimensional rectangular coordinate system that has an origin O' located on an extension of the axis QA of the proximal end side link hub 2 and is orthogonal to the extension of the axis QA (onto a work plane W). The posture acquirer 64 includes a posture acquisition section 64a and a calculation section 64b. The posture acquisition section 64a designates a target distal end posture through manual operation, and the coordinates (X', Y') of the point at which the spherical link center PB of the distal end side link hub 3 is projected onto the two-dimensional rectangular coordinate system that has an origin O' located on the extension of the axis QA of the proximal end side link hub 2 and is orthogonal to the extension of the axis QA (onto the work plane W), are designated by the posture acquisition section 64a.

The posture acquisition section 64a can adopt various designation methods. For example, a designation method, in which the coordinates (X', Y') are inputted as numerical values as described later, is adopted.

The calculation section 64b acquires the distal end posture (θ, φ) represented by the bending angle θ and the turning angle φ, from the coordinates (X', Y') of the point designated by the posture acquisition section 64a and obtained by projection onto the two-dimensional rectangular coordinate system. When the coordinates (X', Y') of the point obtained by projection onto the two-dimensional rectangular coordinate system are used, transformation to the distal end posture (θ, φ) represented by the bending angle θ and the turning angle cp can be easily performed without performing convergence operation. The reason and a calculation formula therefor will be described later.

Figure 8A:
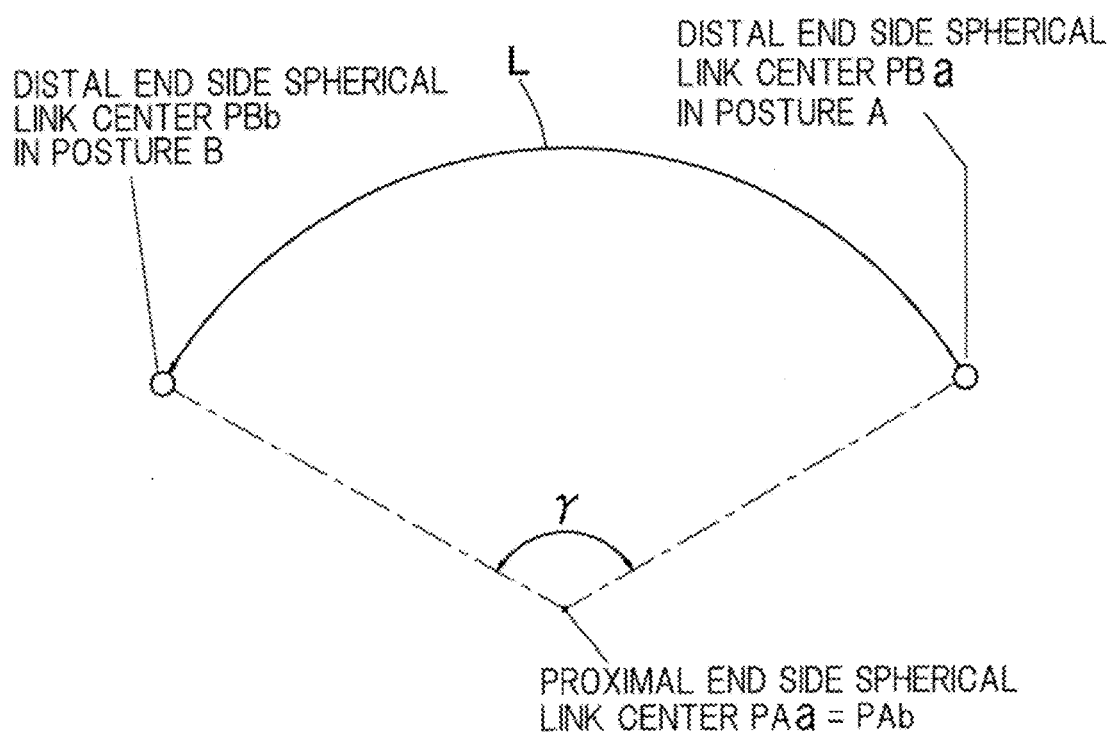
FIG. 8A illustrates a state before relay points are set in the manipulating device for the link actuation device.

The relay point setter 66 sets relay points M, that is, 1st to mth relay points M, which are passed when the distal end posture is changed from a distal end side spherical link center PBa in the posture A to a distal end side spherical link center PBb in the posture B in FIG. 8A. The relay point setter 66 calculates and sets the relay points M according to a determined rule by using the coordinates of the point at which the distal end side spherical link center PB is projected onto the two-dimensional rectangular coordinate system (onto the work plane W). Since the relay points M are set, desired work by the end effector 61 mounted on the distal end side link hub 3 can be accurately performed, and interference of the link actuation device 50 with an article or the like around the link actuation device 50 during movement for posture change can be avoided. In the case of setting the relay points M on a midway path L in movement from a certain posture A to another posture B, the relay points M can be easily obtained, without convergence operation, by using the coordinates (X', Y') at which the distal end side spherical link center PB is projected onto an arbitrary plane, instead of using arbitrary rectangular coordinates (X, Y, Z) in a range on an extension of the posture of the link actuation device 50.

Figure 2:
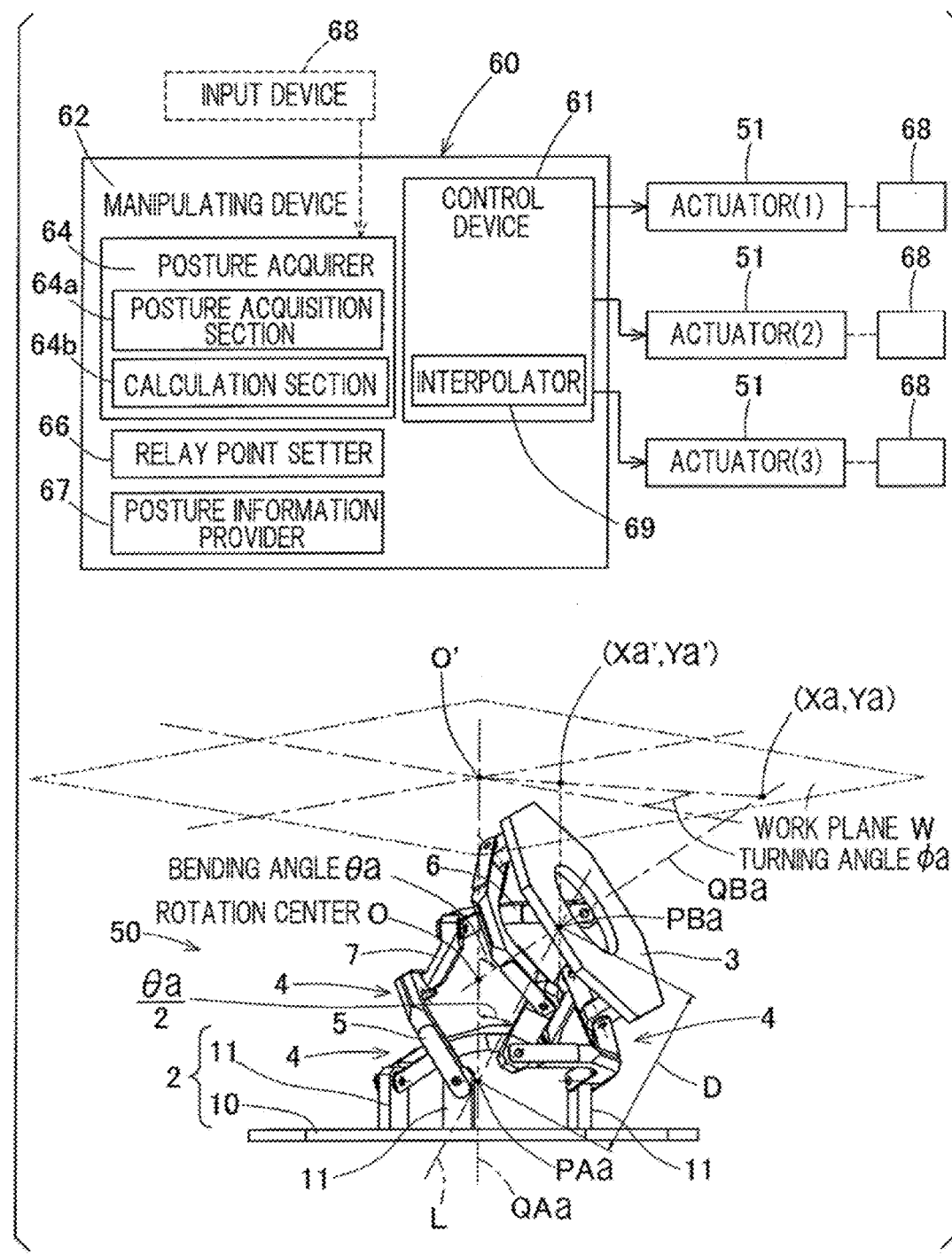
FIG. 2 illustrates a block diagram of the manipulating device and a perspective view of the link actuation device.

In FIG. 2, the posture information provider 67 provides distal end posture information, that is, the bending angle θ and the turning angle φ, acquired by the posture acquirer 64, to the control device 61.

The input device 68 performs an input of designating a distal end posture by numerical values to the posture acquirer 64. The input device 68 designates, for example, through manual operation, a target distal end posture (X', Y') by a coordinate position on the two-dimensional rectangular coordinate system that has an origin O' located on the extension of the axis QA of the proximal end side link hub 2 and is orthogonal to the extension of the axis QA (for example, on the work plane W).

Figure 17:
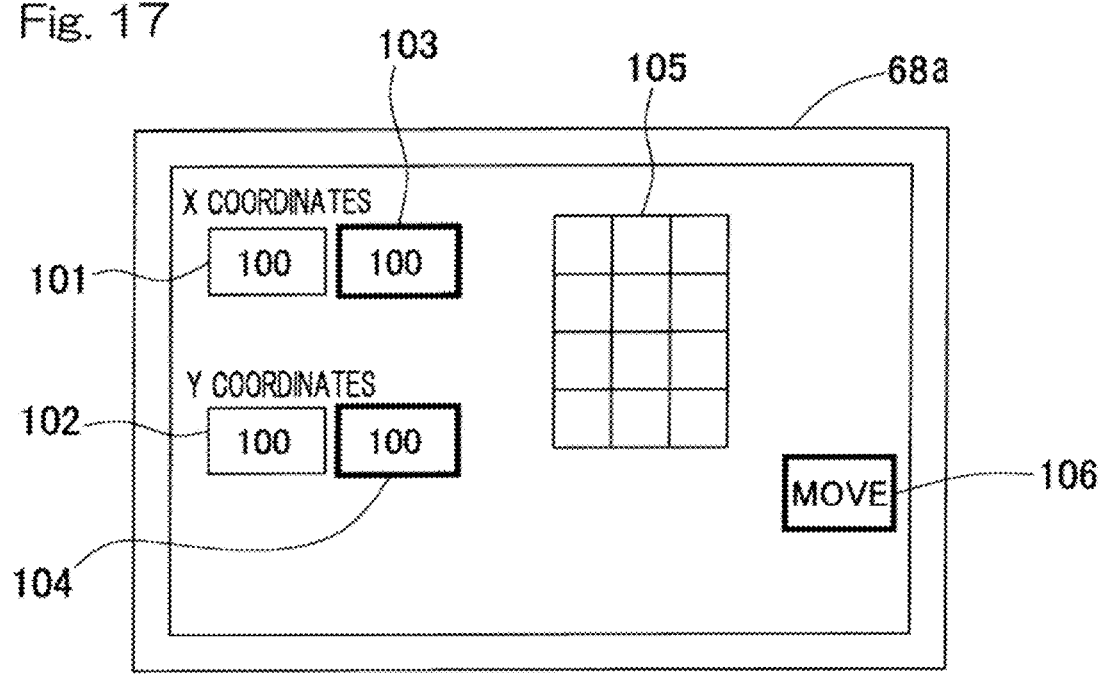
FIG. 17 illustrates an input screen in the manipulating device for the link actuation device.

FIG. 17 shows an example of a screen of an image display device that is a manipulation unit 68a of the input device 88. The manipulation unit 68a is of a type in which a coordinate position is designated through numeric input, and includes: present value display sections 101 and 102; target value display sections 103 and 104; a numeric input button 105; and a movement execution button 106. The present value display sections 101 and 102 display the X' coordinate value and the Y' coordinate value of the present coordinate position, wherein the coordinate position (X', Y') is the position at which the spherical link center PB of the distal end side link hub 3 is projected onto the work plane W, that is, onto the two-dimensional rectangular coordinate system that has an origin O' located on the extension of the axis QA of the proximal end side link hub 2 and is orthogonal to the extension of the axis QA (onto the work plane W). The target value display sections 103 and 104 display a target X' coordinate value and a target Y' coordinate value, respectively. The numeric input button 105 is composed of a ten key or the like for inputting a target X' coordinate value and a target Y' coordinate value to the target value display sections 103 and 104. At the side of the display sections displaying the respective coordinate values, "X COORDINATE" and "Y COORDINATE" are displayed with omission of "'". When a target X' coordinate value and a target Y' coordinate value are inputted by using the numeric input button 105, the values are displayed in the target value display sections 103 and 104.

Figure 18:
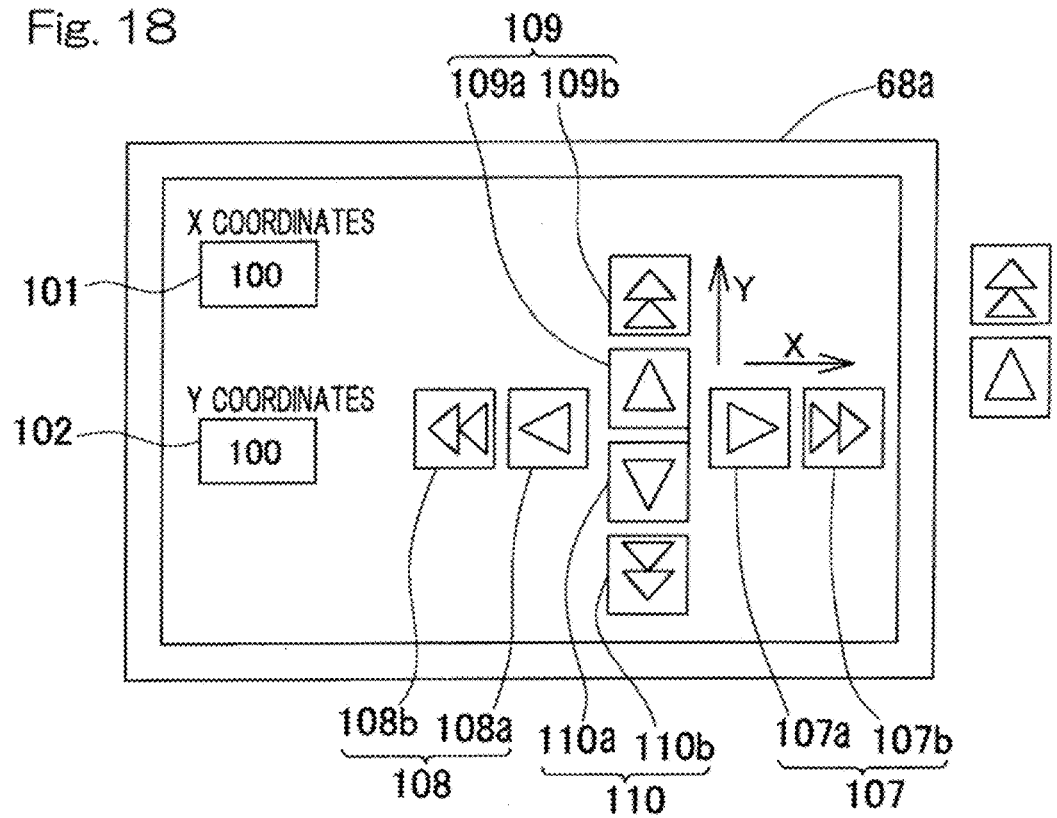
FIG. 18 illustrates another example of the input screen in the manipulating device for the link actuation device.

FIG. 18 shows a different example of the manipulation unit 68a of the input device 68. The manipulation unit 68a is of a type in which a coordinate position is designated by a manipulation amount, and has: present value display sections 101 and 102 that display the X' coordinate value and the Y' coordinate value of the present coordinate position; and push buttons 107 to 110 for changing the distal end posture. When the push button 107 is pushed, the posture is changed to the side at which the X' coordinate value is increased. When the push button 108 is pushed, the posture is changed to the side at which the X' coordinate value is decreased. When the push button 109 is pushed, the posture is changed to the side at which the Y' coordinate value is increased. When the push button 110 is pushed, the posture is changed to the side at which the Y' coordinate value is decreased.

The degree of posture change is changed in accordance with a time for which the push buttons 107 to 110 are pushed or the number of times the push buttons 107 to 110 are pushed. In addition, in this example, the push buttons 107 to 110 include: low-speed buttons 107a, 108a, 109a, and 110a with which the posture is changed at low speed; and high-speed buttons 107b, 108b, 109b, and 110b with which the posture is changed at high speed, and thus, the posture can be changed at two levels, that is, at low speed and at high speed.

The principle, the details, and operation of the above configuration will be described. In FIG. 2, on the proximal end side and the distal end side, the "spherical link centers PA and PB" refer to points at which the axes of the revolute pairs between the link hubs 2 and 3 and the arms (end link members 5 and 6) and the revolute pairs between the respective arms and the intermediate link member 7 intersect each other.

The posture acquirer 64 acquires the distal end posture (θ, φ) represented by the bending angle θ and the turning angle φ, from the coordinate position (X', Y') at which the spherical link center PB of the distal end side link hub 3 is projected onto the two-dimensional rectangular coordinate system that has an origin O' located on the extension of the axis QA of the proximal end side link hub 2 and is orthogonal to the extension of the axis QA (onto the work plane W). A plane that is the two-dimensional rectangular coordinate system only needs to have an origin located on the extension of the axis QA of the proximal end side link hub 2, and may have any distance from the proximal end side link hub 2. The plane is generally set as a work plane on which work is performed by the end effector 61 mounted on the distal end side link hub 3, and thus, is referred to as work plane W in the following description.

Figure 3:
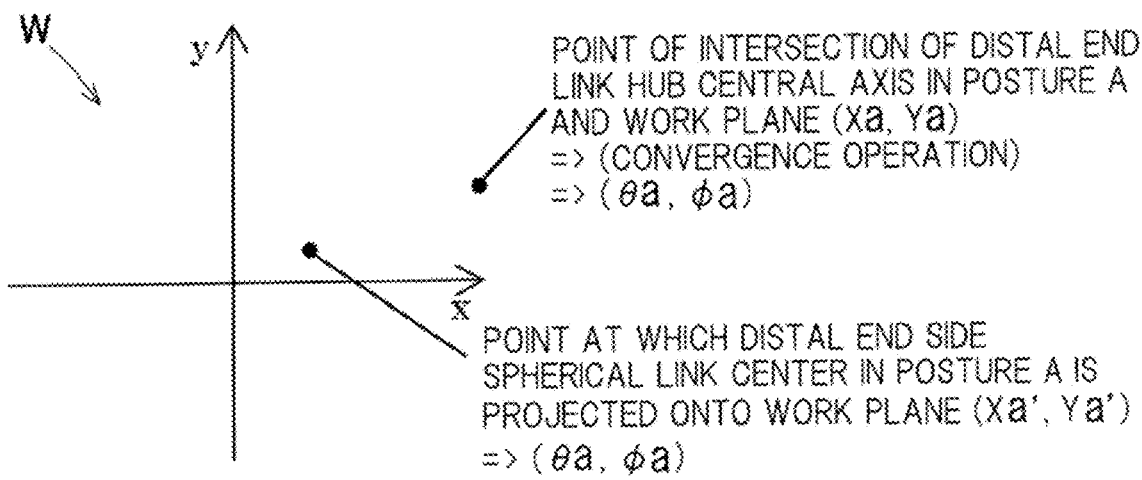
FIG. 3 illustrates projection of a distal end side spherical link center in the manipulating device for the link actuation device onto a work plane.

In FIG. 3, in order to obtain a distal end posture represented by a bending angle θa and a turning angle (pa from a point of intersection (Xa, Ya), on the work plane W, of the distal end side link hub 3 in a certain posture A of the link actuation device 50, convergence operation is required. However, in order to obtain the distal end posture represented by the bending angle θa and the turning angle (pa from a point (Xa', Ya') at which the distal end side spherical link center in the posture A is projected onto the work plane W, the distal end posture can be easily obtained from the relationship of the following equations without convergence operation. These equations are satisfied since the distance (D in FIG. 5) between the respective proximal end side and distal end side spherical link centers is always constant.

$$X'_a = D\sin\left(\frac{\theta_a}{2}\right)\cos\phi_a \quad \Rightarrow \quad \sin\left(\frac{\theta_a}{2}\right) = \frac{\sqrt{X'^2_a + Y'^2_a}}{D}$$
$$Y'_a = D\sin\left(\frac{\theta_a}{2}\right)\sin\phi_a \quad \quad \tan\phi_a = \frac{Y'_a}{X'_a}$$

Figure 4:
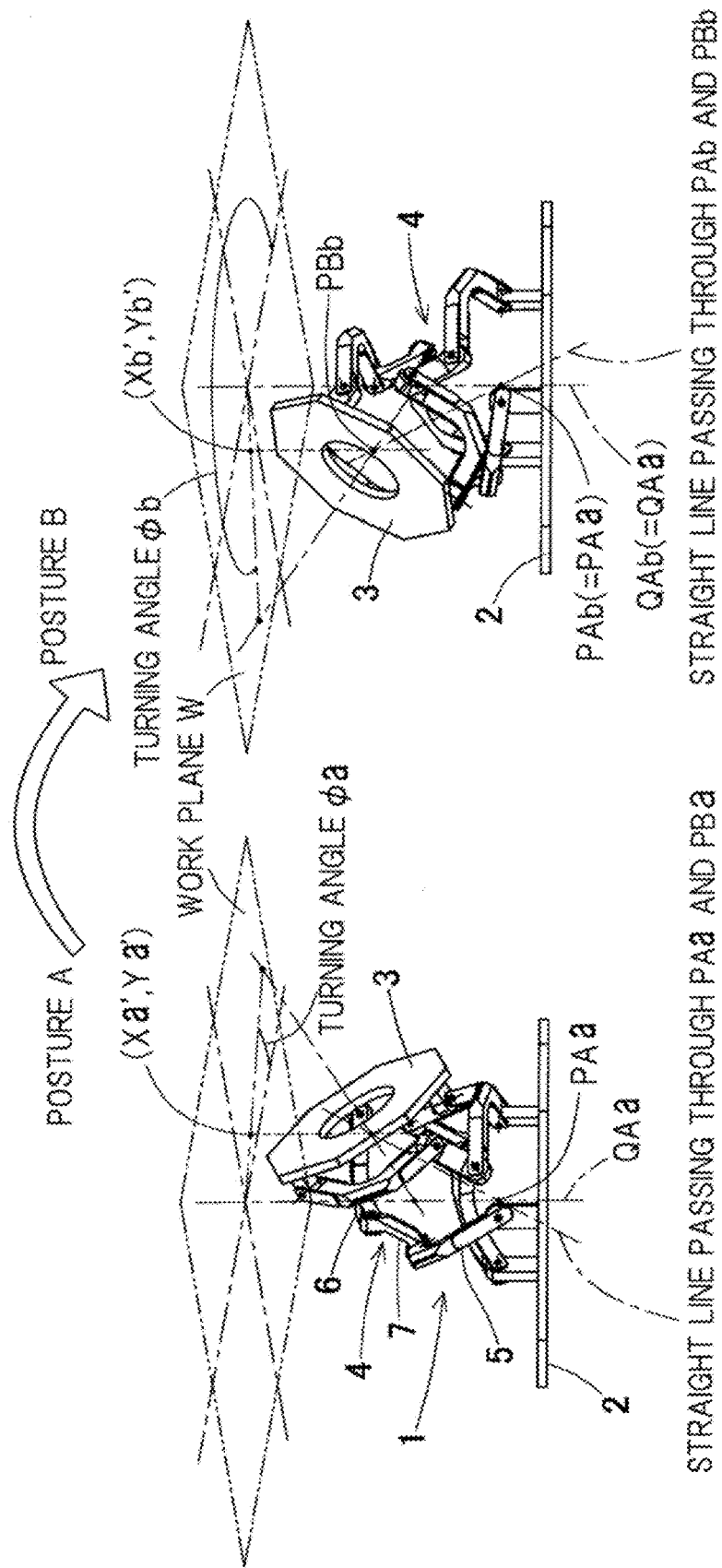
FIG. 4 is a perspective view showing states before and after the posture of the link actuation device is changed.
Figure 5:
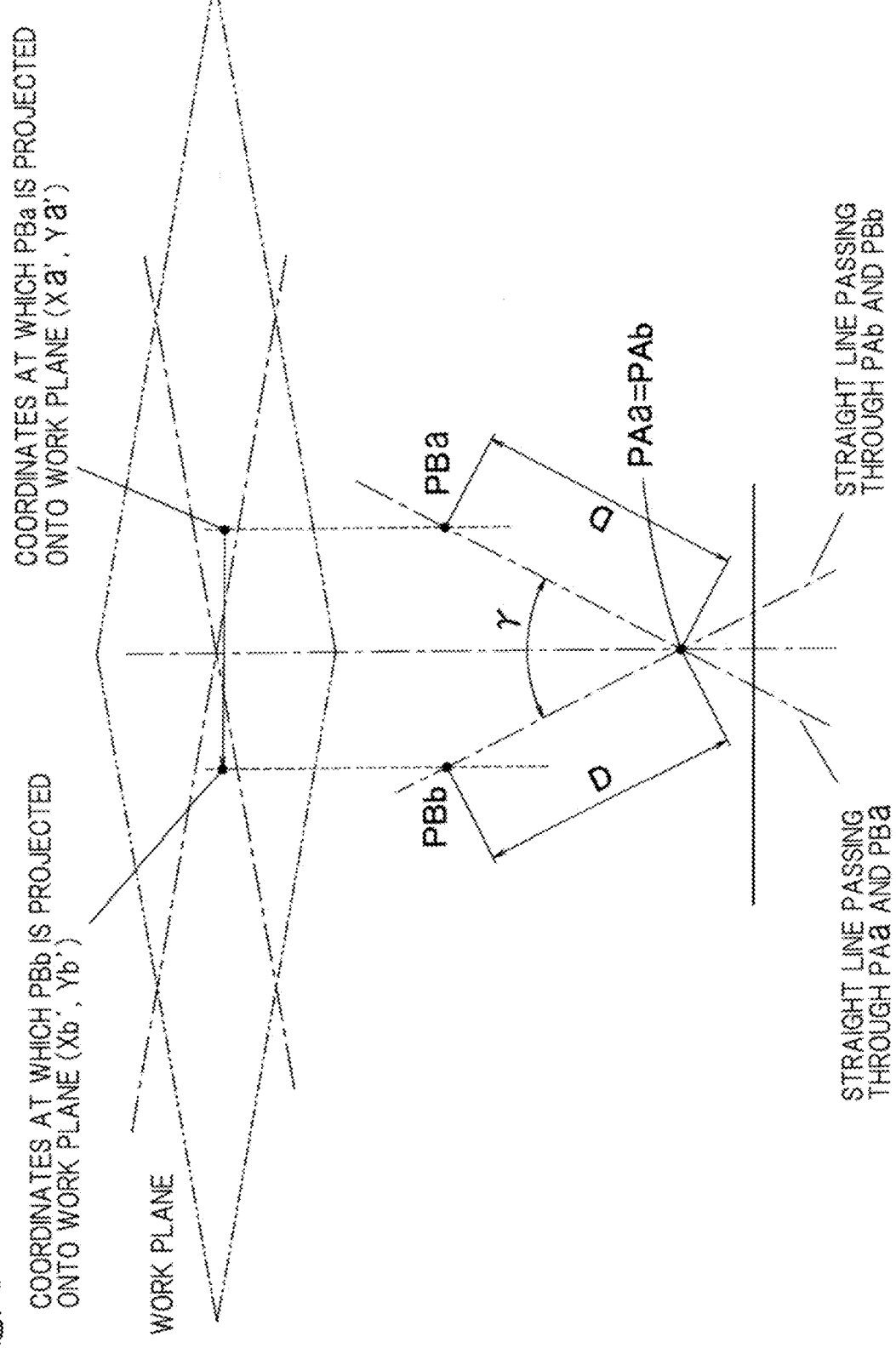
FIG. 5 illustrates the relationship between the work plane and spherical link centers projected onto the plane.
Figure 6:
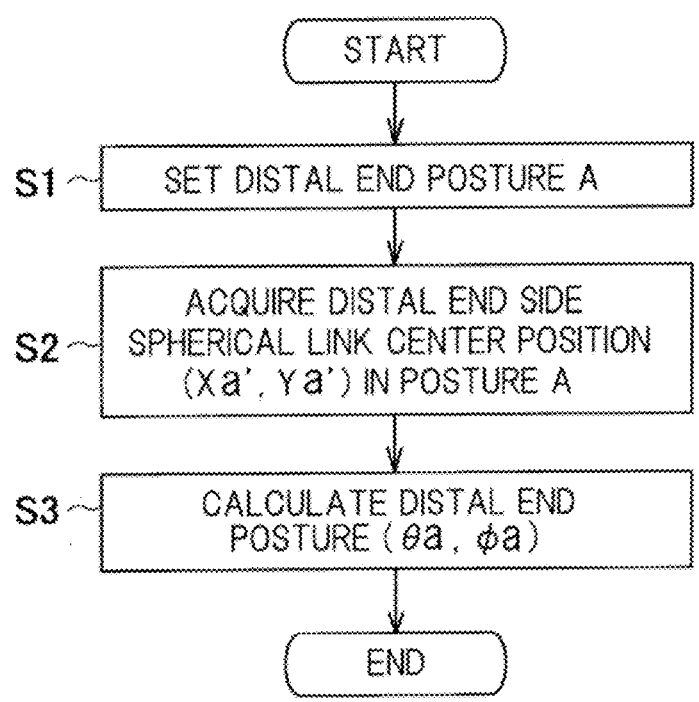
FIG. 6 is a flowchart showing a process in the case of setting no relay point in the manipulating device for the link actuation device.

The case of changing from a certain posture A of the distal end side link hub 3 (hereinafter, referred to as "distal end posture A") to another posture B thereof (hereinafter, referred to as "distal end posture B") shown in FIG. 4 will be described. Flow of a process of acquiring the distal end posture A ($\theta a$, $\varphi a$) will be described with reference to FIG. 6. First, the distal end posture A is set (step S1). Regarding setting of the distal end posture A, for example, when an operator performs a numeric input to the input device 68 (see FIG. 2) and performs an operation for confirming the input, the posture acquisition section 64a sets the distal end posture A by the inputted coordinates. The distal end posture A may be set by manually moving the link actuation device 50 to the distal end posture A.

The posture acquisition section 64a performs transformation from information of the set distal end posture A by three-dimensional coordinates (X, Y, Z), and acquires the coordinates (Xa', Ya') of a point at which the distal end side spherical link center PB is projected onto the work plane W (step S2). The calculation section 64b obtains a distal end posture ($\theta a$, $\varphi a$) represented by a bending angle $\theta a$ and a turning angle $\varphi a$ through calculation from the obtained coordinates (Xa', Ya') of the point on the work plane W (step 3). A distal end posture B ($\theta b$, $\varphi b$) is acquired in the same manner as the acquisition of the distal end posture A ($\theta a$, $\varphi a$).

Information of both of the distal end posture A ($\theta a$, $\varphi a$) and the distal end posture B ($\theta b$, $\varphi b$) acquired as described above is provided to the control device 61 by the posture information provider 67, and the control device 61 controls each actuator 51 of the link actuation device 50.

Figure 9:
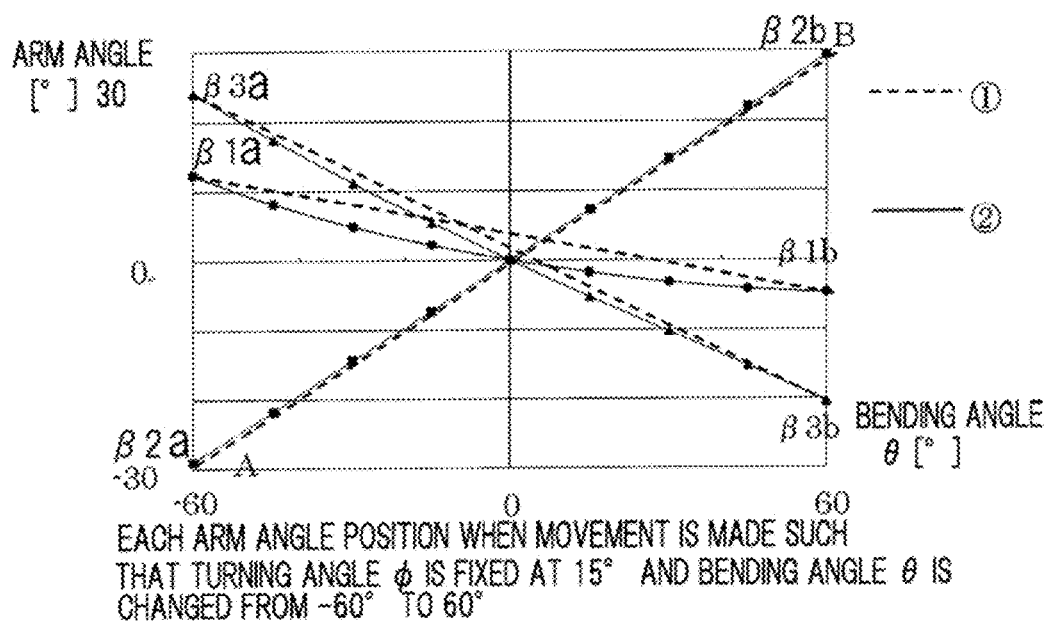
FIG. 9 illustrates a bending angle and an arm angle when the link actuation device is linearly moved in a Point-To-Point manner from a posture A to a posture B, and when a bending angle θ is continuously changed, in changing of the posture of the link actuation device from the posture A to the posture B by a wide angle.

FIG. 9 shows each arm angle position when movement is made such that the turning angle $\varphi$ is fixed at 15° and the bending angle $\theta$ is changed from −60° to 60°. A curve (1) (indicated by a circled number in the drawing) represents the trajectory of the rotation angle position of each arm when the arm is driven linearly in a Point-to-Point manner from a distal end position A to a distal end position B in posture change from the position A to the position B. A curve (2) represents the trajectory of the rotation angle position of each arm when the bending angle $\theta$ is continuously changed in posture change from the distal end position A to the distal end position B. When movement is made from the distal end position A to the distal end position B by a wide angle, if no relay point is provided, the rotation angle position of each arm draws the trajectory represented by the curve (1), and the relative position of each arm rotation angle at each bending angle and each turning angle greatly deviate from the position (the curve (2)) that satisfies the relation formula (1). Thus an excessive load is applied to the parallel link mechanism 1.

Figure 7:
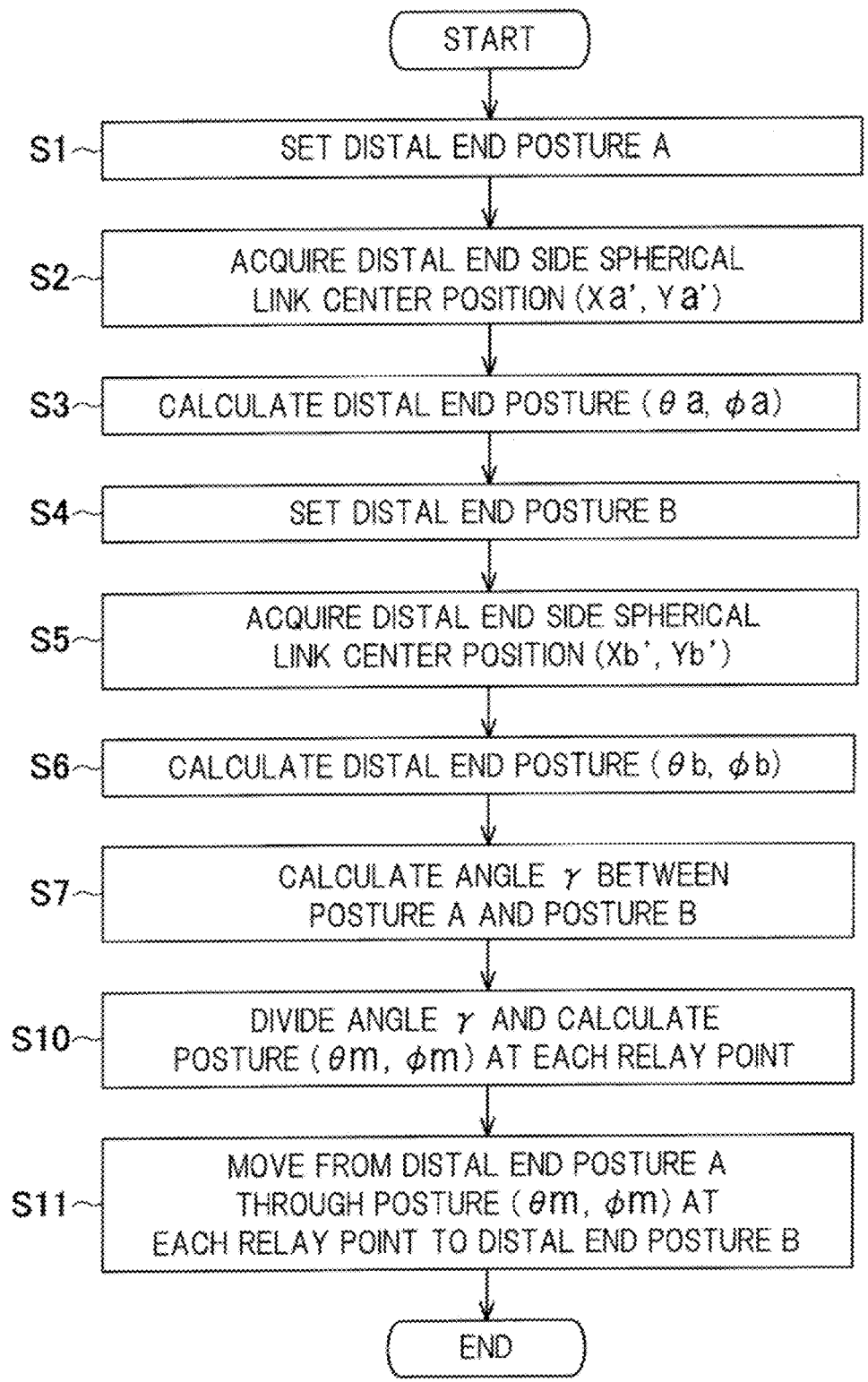
FIG. 7 is a flowchart showing a process in the case of setting relay points in the manipulating device for the link actuation device.
Figure 8B:
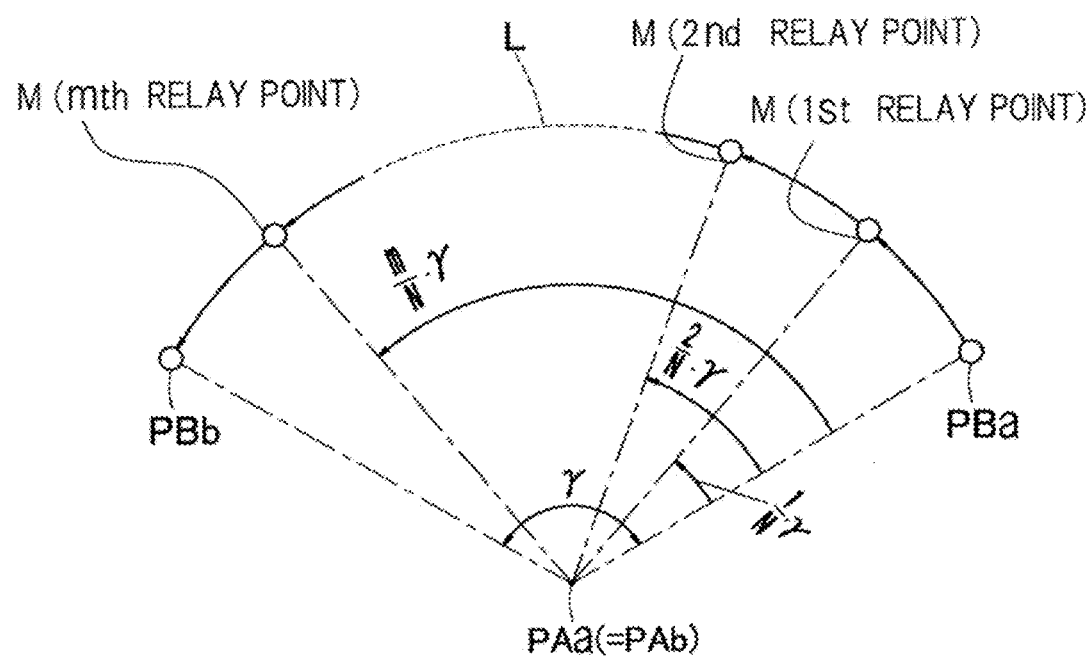
FIG. 8B illustrates an example of a method for setting relay points in the manipulating device for the link actuation device with respect to FIG. 8A.
Figure 11:
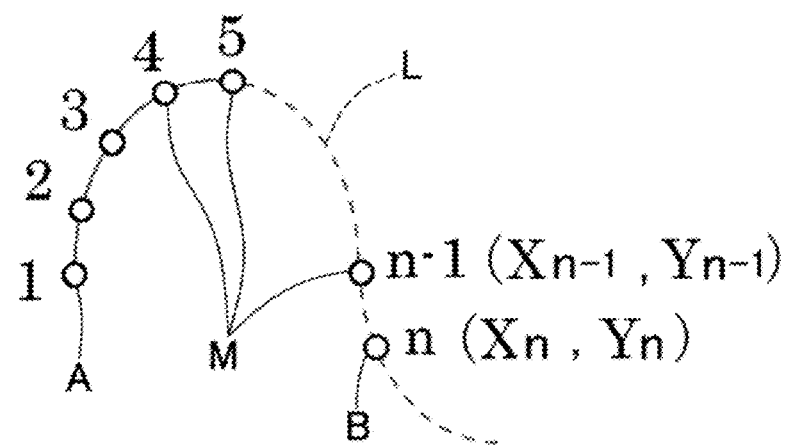
FIG. 11 illustrates an example of setting of relay points in the manipulating device for the link actuation device.

FIG. 7 shows flow of a process in the case of setting a plurality of relay points M on a midway path L as shown in FIG. 8B or FIG. 11 during posture change from the distal end posture A to the distal end posture B. The following setting of relay points is performed by the relay point setter 66 (see FIG. 2). Similar to the above-described procedure shown in FIG. 6, setting of a distal end posture A (step S1), acquisition of a distal end side spherical link center position (Xa', Ya') on the work plane W (step S2), and calculation of a distal end posture A ($\theta a$, $\varphi a$) represented by a bending angle $\theta a$ and a turning angle ($\varphi a$ (step S3) are performed. Similar to the case for the distal end posture A, setting of a distal end posture B (step S4), acquisition of a distal end side spherical link center position (Xb', Yb') on the work plane W (step S5), and calculation of a distal end posture B ($\theta b$, $\varphi b$) represented by a bending angle $\theta b$ and a turning angle $\varphi b$ (step S6) are performed.

Thereafter, the angle $\gamma$ between the distal end posture A and the distal end posture B on the work plane W is calculated (step S7). The angle $\gamma$ is divided, and a posture ($\theta m$, $\varphi m$) at each relay point M is calculated (step S10). Information of the relay points M ($\theta m$, $\varphi m$) set as described above is provided, together with the information of the distal end posture A ($\theta a$, $\varphi a$) and the distal end posture B ($\theta b$, $\varphi b$), to the control device 61 by the posture information provider 67. The control device 61 moves the distal end side spherical link center of the link actuation device 50 from the distal end posture A through each relay point M ($\theta m$, $\varphi m$) to the distal end posture B ($\theta b$, $\varphi b$) (step S11).

As described above, in the case of setting the relay points M on the midway path in movement from the distal end posture A to the distal end posture B, each relay point M can be easily obtained, without convergence operation, by using the coordinates (X', Y', Z') at which the distal end side spherical link center is projected onto the work plane W, which is an arbitrary plane, instead of using arbitrary rectangular coordinates (X, Y, Z) in the range on the extension of the posture of the link actuation device 50. In addition, in the case of dividing the midway path L and continuously passing through the divided midway path L in changing the posture from the distal end posture A to the distal end posture B, the path is preferably divided such that the angle $\gamma$, formed by the distal end side spherical link center PBa and the proximal end side spherical link center PAa (=PAb) in the distal end posture A and the distal end side spherical link center PBb in the distal end posture B, is equally divided as described above. Accordingly, convergence operation, that is required for division using the rectangular coordinates of the distal end before and after posture change, is rendered to be unnecessary.

Figure 10:
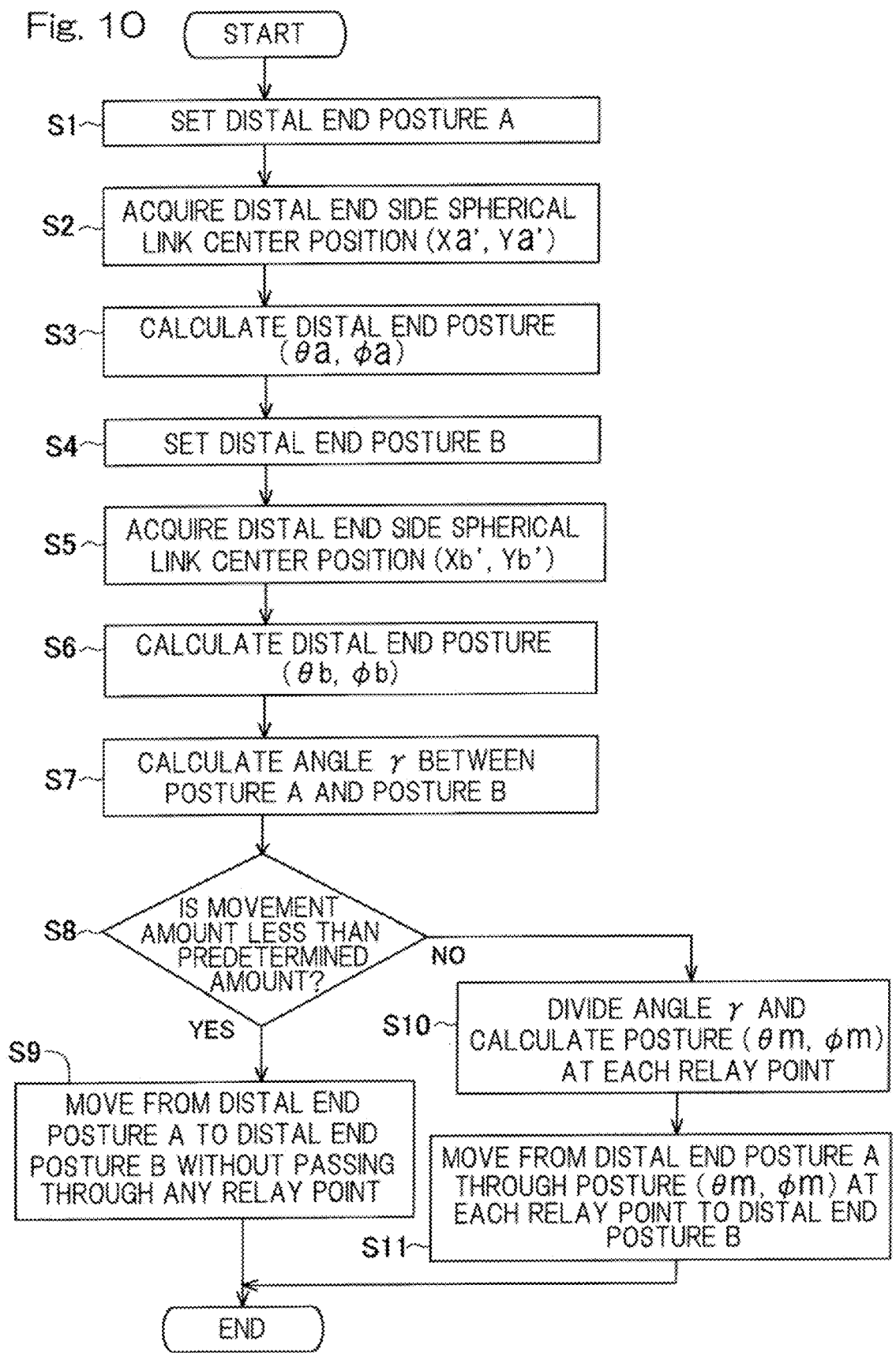
FIG. 10 is a flowchart showing another example of the process in the case of performing setting of relay points in the manipulating device for the link actuation device.

FIG. 10 shows a process in the case of setting relay points M only when a movement amount from the distal end posture A to the distal end posture B exceeds a predetermined amount. In FIG. 10, steps in which the same processes as in FIG. 7 are performed are designated by the same step numbers as in FIG. 7. Similar to the example in FIG. 7, calculation of the angle $\gamma$ between the distal end posture A and the distal end posture B (step S7) is performed. Then, whether a movement amount is equal to or less than a predetermined amount is determined (step S8). The movement amount may be determined, for example, by the angle $\gamma$. In addition, the movement amount may be determined by using coordinates (X', Y', Z') at which the distal end side spherical link center in each of the distal end posture A and the distal end posture B is projected onto the work plane W, which is an arbitrary plane. When the movement amount is equal to or less than the predetermined amount, no relay point M is set, and movement is made from the distal end posture A to the distal end posture B without passing through any relay point M (step S9).

When the movement amount exceeds the predetermined amount in the determination in step S8, the angle γ is divided and a posture (θm, φm) at each relay point M is calculated (step S10) similar to the above. Thereafter, movement is made from the distal end posture A through each relay point M (θm, φm) to the distal end posture B (step S11) similar to the above.

The above-mentioned relation formula (1) is the following formula.

$$\cos(\theta/2)\sin\beta n - \sin(\theta/2)\sin(\varphi + \delta n)\cos\beta n + \sin(\varepsilon/2) = 0;$$
$$(n=1,2,3)$$

Here, ε is the angle formed between the coupling end axis of the intermediate link member 7 rotatably coupled to the proximal side end link member 5 and the coupling end axis of the intermediate link member 7 rotatably coupled to the distal side end link member 6. δn is the separation angle in the circumferential direction of each proximal side end link member 5 relative to the proximal side end link member 5 that serves as a reference.

In the embodiment described above, the relay point setter 66 performs division based on angle. However, the relay point setter 66 may be configured to equally divide, by distance, the midway path L through which the distal end side spherical link center PB passes, for example, as shown in FIG. 11.

In the case of changing the posture from the distal end posture A to the distal end posture B by a wide angle, if the relative position of each arm rotation angle on the midway path L greatly deviates from the position that satisfies the relation formula, an excessive load is applied to the parallel link mechanism 1. Thus, by providing the relay points M, which satisfy the relation formula, on the midway path and performing positioning control without great deviation from the relay points M, high-speed movement can be achieved without applying an excessive load to the parallel link mechanism 1. In obtaining the posture at each relay point M, the posture can be easily obtained by using the projection coordinates of the distal end side spherical link center.

In the case of changing the posture from the distal end posture A to the distal end posture B as described above, the movement path between the respective points (the distal end posture A, the distal end posture B, and the relay points M) by which the distal end posture is designated is preferably interpolated by an interpolator 69 (see FIG. 2). The interpolation is, for example, linear interpolation or circular interpolation. For example, the interpolator 69 is provided in the control device 61 in FIG. 2 and is configured to perform an interpolation process when the link actuation device 50 is moved according to the information of the distal end posture A, the distal end posture B, and the relay points M. In this case, the "manipulating device" means to have a configuration including the interpolator 69. In addition, the interpolator 69 may be provided in the manipulating device 62 and may be configured to obtain the coordinates (θ, φ) of each position on the midway path L to be interpolated, so as to provide the obtained coordinates (θ, φ) from the posture information provider 67 to the control device 61.

Although the present invention has been fully described in connection with the preferred embodiments thereof with reference to the accompanying drawings, numerous additions, modifications and omissions can be made without departing from the gist of the present invention. Accordingly, such additions, modifications and omissions are to be construed as included in the scope of the present invention.

REFERENCE NUMERALS

1 . . . parallel link mechanism
2 . . . proximal end side link hub
3 . . . distal end side link hub
4 . . . link mechanism
5 . . . proximal side end link member
6 . . . distal side end link member
7 . . . intermediate link member
50 . . . link actuation device
51 . . . actuator
60 . . . controller
61 . . . control device
62 . . . manipulating device
64 . . . posture acquirer
64a . . . posture acquisition section
64b . . . calculation section
66 . . . relay point setter
67 . . . posture information provider
68 . . . input device
69 . . . interpolator
O . . . rotation center
PAa . . . proximal end side spherical link center
PBa . . . distal end side spherical link center
QAa . . . axis of proximal end side link hub
QBa . . . axis of distal end side link hub
θ . . . . bending angle
φ . . . turning angle
W . . . work plane
(Aa, Ya) . . . point of intersection on work plane
(Aa', Ya') . . . point by projection

What is claimed is:

1. A manipulating device for a link actuation device, the link actuation device including: a proximal end side link hub; a distal end side link hub; three or more link mechanisms interposed between the proximal end side link hub and the distal end side link hub, at least one link mechanism among the three or more link mechanisms coupling the distal end side link hub to the proximal end side link hub such that a posture of the distal end side link hub can be changed relative to the proximal end side link hub; and an actuator provided to each of two or more link mechanisms among the three or more link mechanisms and configured to change the posture of the distal end side link hub relative to the proximal end side link hub, wherein each of the three or more link mechanisms includes: a proximal side end link member having one end rotatably coupled to the proximal end side link hub; a distal side end link member having one end rotatably coupled to the distal end side link hub; and an intermediate link member having opposite ends rotatably coupled to other ends of the proximal side and distal side end link members, respectively, wherein a distal end posture is defined by a bending angle, that is a vertical angle formed when an axis of the distal end side link hub is inclined relative to an axis of the proximal end side link hub; and a turning angle, that is a horizontal angle formed when the axis of the distal end side link hub is inclined relative to the axis of the proximal end side link hub, the manipulating device comprising:

a controller, comprising at least one memory and at least one processor, configured to:
   determine the distal end posture represented by the bending angle and the turning angle based on a coordinate position at which a spherical link center of the distal end side link hub is projected onto a two-dimensional rectangular coordinate system, the coordinate position being a coordinate position at which, when the axis of the distal end side link hub is inclined relative to the axis of the proximal end side link hub, an imaginary line, orthogonal to the two-dimensional rectangular coordinate system and passing through the spherical link center of the distal end side link hub, intersects the two-dimensional rectangular coordinate system, and wherein the two-dimensional rectangular coordinate system is orthogonal to an extension of the axis of the proximal end side link hub and has an origin at a point of intersection between the extension of the axis of the proximal end side link hub and the two-dimensional rectangular coordinate system.

2. The manipulating device for the link actuation device as claimed in claim 1, wherein the controller is further configured to:

receive, from an input device, the coordinate position, which is manually input to the input device by a user of the input device.

3. The manipulating device for the link actuation device as claimed in claim 1, wherein the controller is further configured to set a relay point that is passed when the distal end posture is changed, and the controller is further configured to calculate and set the relay point, based on a determined rule, by using the coordinate position.

4. The manipulating device for the link actuation device as claimed in claim 3, wherein the controller is further configured to calculate and set the relay point by dividing an angle formed by: the distal end side spherical link center before change of the distal end posture; a proximal end side spherical link center; and a distal end side spherical link center after change of the distal end posture.

5. The manipulating device for the link actuation device as claimed in claim 3, wherein, when a movement amount of the distal end posture is to be greater than a predetermined movement amount, the controller is further configured to set the relay point by dividing the movement amount so as to make the movement amount equal to or less than the predetermined movement amount.

6. The manipulating device for the link actuation device as claimed in claim 3, wherein the controller is further configured to set the relay point by dividing a midway path for the distal end posture by a predetermined number.

7. The manipulating device for the link actuation device as claimed in claim 3, wherein the controller is further configured to equally divide a midway path through which the distal end side spherical link center passes.

8. The manipulating device for the link actuation device as claimed in claim 3, wherein the controller is further configured to perform linear interpolation of a midway path through which the distal end side spherical link center passes.

9. The manipulating device for the link actuation device as claimed in claim 3, wherein the controller is further configured to perform circular interpolation of a midway path through which the distal end side spherical link center passes.

10. A link actuation system, comprising:

a link actuation device, including:
a proximal end side link hub,
a distal end side link hub,
three or more link mechanisms interposed between the proximal end side link hub and the distal end side link hub, at least one link mechanism among the three or more link mechanisms coupling the distal end side link hub to the proximal end side link hub such that a posture of the distal end side link hub can be changed relative to the proximal end side link hub, and an actuator provided to each of two or more link mechanisms among the three or more link mechanisms and configured to change the posture of the distal end side link hub relative to the proximal end side link hub, wherein each of the three or more link mechanisms includes:
a proximal side end link member having one end rotatably coupled to the proximal end side link hub,
a distal side end link member having one end rotatably coupled to the distal end side link hub, and
an intermediate link member having opposite ends rotatably coupled to other ends of the proximal side and distal side end link members, respectively, a distal end posture is defined by a bending angle, that is a vertical angle formed when an axis of the distal end side link hub is inclined relative to an axis of the proximal end side link hub, and a turning angle, that is a horizontal angle formed when the axis of the distal end side link hub is inclined relative to the axis of the proximal end side link hub; and a manipulating device, including a controller having at least one memory and at least one processor, the controller being configured to:

determine the distal end posture represented by the bending angle and the turning angle based on a coordinate position at which a spherical link center of the distal end side link hub is projected onto a two-dimensional rectangular coordinate system, the coordinate position being a coordinate position at which, when the axis of the distal end side link hub is inclined relative to the axis of the proximal end side link hub, an imaginary line, orthogonal to the two-dimensional rectangular coordinate system and passing through the spherical link center of the distal end side link hub, intersects the two-dimensional rectangular coordinate system, and wherein the two-dimensional rectangular coordinate system is orthogonal to an extension of the axis of the proximal end side link hub and has an origin at a point of intersection between the extension of the axis of the proximal end side link hub and the two-dimensional rectangular coordinate system.

11. The manipulating device for the link actuation device as claimed in claim 1, wherein the controller is further configured to receive, from an input device, coordinates input as numerical values by an operator of the input device which correspond to the coordinate position at which the spherical link center of the distal end side link hub is projected onto the two-dimensional rectangular coordinate system.

12. The manipulating device for the link actuation device as claimed in claim 1, wherein the controller is further configured to:

receive, from an input device, coordinates of a three-dimensional rectangular coordinate system input by an operator of the input device, and transform the coordinates of the three-dimensional rectangular coordinate system to the coordinate position at which the spherical link center of the distal end side link hub is projected onto the two-dimensional rectangular coordinate system.

13. The manipulating device for the link actuation device as claimed in claim 1, wherein the controller is configured to transform the coordinate position at which the spherical link center of the distal end side link hub is projected onto the two-dimensional rectangular coordinate system to the distal end posture represented by the bending angle and the turning angle, without performing a convergence operation.

14. The manipulating device for the link actuation device as claimed in claim 1, wherein the controller is configured to determine the turning angle from the coordinate position, based on a ratio of a first distance in a first axis direction from the origin of the two-dimensional rectangular coordinate system to a second distance in a second axis direction from the origin of the two-dimensional rectangular coordinate system.

* * * * *